US012723804B2

(12) United States Patent
Kim et al.

(10) Patent No.: US 12,723,804 B2
(45) Date of Patent: Sep. 1, 2026

(54) REFRIGERATOR COMPRISING SPEAKER DEVICE FOR REFRIGERATOR

(71) Applicant: Samsung Electronics Co., Ltd., Suwon-si (KR)

(72) Inventors: Kidu Kim, Suwon-si (KR); Jaeyeon Hwang, Suwon-si (KR); Hani Yang, Suwon-si (KR); Odo Yu, Suwon-si (KR); Suho Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 18/941,827

(22) Filed: Nov. 8, 2024

(65) Prior Publication Data

US 2025/0067502 A1 Feb. 27, 2025

Related U.S. Application Data

(63) Continuation of application No. PCT/KR2023/004380, filed on Mar. 31, 2023.

(30) Foreign Application Priority Data

May 31, 2022 (KR) ........................ 10-2022-0066915
Oct. 13, 2022 (KR) ........................ 10-2022-0131821

(51) Int. Cl.
*F25D 23/02* (2006.01)
*H04R 1/02* (2006.01)

(52) U.S. Cl.
CPC ............ *F25D 23/028* (2013.01); *H04R 1/02* (2013.01)

(58) Field of Classification Search
CPC ........ F25D 23/02; F25D 23/028; F25D 23/12; F25D 29/00; F25D 29/005; H04R 1/02;
(Continued)

(56) References Cited

U.S. PATENT DOCUMENTS 5,749,433 A * 5/1998 Jackson ............... H04R 1/2834 181/156
6,393,848 B2 5/2002 Roh et al.
(Continued)

FOREIGN PATENT DOCUMENTS

CN 112041624 A 12/2020
JP 3955866 B2 8/2007
(Continued)

OTHER PUBLICATIONS

KR1020210074924 translation (Year: 2021).*
International Search Report dated Jul. 7, 2023, issued in International Application No. PCT/KR2023/004380.

*Primary Examiner* — Hiwot E Tefera
(74) *Attorney, Agent, or Firm* — Jefferson IP Law, LLP

(57) ABSTRACT

A refrigerator is provided. The refrigerator includes a main body, a storage compartment, a door configured to open and close the storage compartment, and a speaker device embedded in the door, wherein the door includes upper door and lower door, wherein the speaker device includes at least one first speaker facing a first direction that is a user handle space direction, and configured to output sound in a full-range frequency band, and at least one second speaker facing a second direction that is a door inner wall surface direction as a direction different from the first direction, and configured to output sound in a full-range frequency band.

15 Claims, 18 Drawing Sheets

(58) Field of Classification Search
CPC .......... H04R 1/40; H04R 1/028; H04R 1/345; H04R 1/24; H04R 1/227; H04R 1/2834; H04R 1/026
See application file for complete search history.

(56) References Cited

U.S. PATENT DOCUMENTS

| | | | | |
|---|---|---|---|---|
| 10,429,124 | B2 | 10/2019 | Seo et al. | |
| 11,076,212 | B2 | 7/2021 | Kwon et al. | |
| 2005/0134473 | A1 | 6/2005 | Jang et al. | |
| 2010/0242515 | A1 | 9/2010 | Kim | |
| 2010/0320890 | A1* | 12/2010 | Jung | F25D 27/00 312/405 |
| 2011/0026751 | A1* | 2/2011 | Hilbowicki | H04R 1/2807 381/345 |
| 2015/0146904 | A1 | 5/2015 | Chien | |
| 2015/0195629 | A1* | 7/2015 | Sumitani | H04R 7/04 381/191 |
| 2015/0224942 | A1* | 8/2015 | Liono | B60R 11/0235 381/86 |
| 2016/0029116 | A1* | 1/2016 | Jenkins | H04R 1/025 381/345 |
| 2016/0353198 | A1* | 12/2016 | Sahyoun | H04R 1/2826 |
| 2016/0373854 | A1* | 12/2016 | Han | H04R 1/2834 |
| 2018/0031312 | A1* | 2/2018 | Kim | F25D 29/008 |
| 2018/0187951 | A1 | 7/2018 | Seo et al. | |
| 2020/0003486 | A1* | 1/2020 | Kim | G06N 20/00 |
| 2020/0124340 | A1* | 4/2020 | Tang | F25D 11/02 |
| 2020/0252705 | A1* | 8/2020 | Kwon | H04R 1/028 |
| 2021/0200264 | A1 | 7/2021 | Kim et al. | |
| 2022/0253094 | A1 | 8/2022 | Park et al. | |
| 2022/0303652 | A1 | 9/2022 | Kim et al. | |
| 2023/0228482 | A1* | 7/2023 | Cho | F25D 29/008 62/125 |

FOREIGN PATENT DOCUMENTS

| | | | | |
|---|---|---|---|---|
| KR | 10-0565583 | B1 | 3/2006 | |
| KR | 10-0764279 | B1 | 10/2007 | |
| KR | 10-2008-0033782 | A | 4/2008 | |
| KR | 10-0833304 | B1 | 5/2008 | |
| KR | 10-1245886 | B1 | 3/2013 | |
| KR | 10-2017-0027007 | A | 3/2017 | |
| KR | 10-1830372 | B1 | 2/2018 | |
| KR | 10-2020-0095140 | A | 8/2020 | |
| KR | 10-2021-0074924 | A | 6/2021 | |
| KR | 10-2021-0085866 | A | 7/2021 | |
| KR | 10-2021-0086124 | A | 7/2021 | |
| WO | WO-2020222803 | A1 * | 11/2020 | H04R 1/2834 |

* cited by examiner

REFRIGERATOR COMPRISING SPEAKER DEVICE FOR REFRIGERATOR

CROSS-REFERENCE TO RELATED APPLICATION(S)

This application is a continuation application, claiming priority under § 365(c), of an International application No. PCT/KR2023/004380, filed on Mar. 31, 2023, which is based on and claims the benefit of a Korean patent application number 10-2022-0066915, filed on May 31, 2022, in the Korean Intellectual Property Office, and of a Korean patent application number 10-2022-0131821, filed on Oct. 13, 2022, in the Korean Intellectual Property Office, the disclosure of each of which is incorporated by reference herein in its entirety.

BACKGROUND

1. Field

The disclosure relates to speaker devices which, as speaker devices included in refrigerators, may be embedded in a limited space of a refrigerator and may output high-band and low-band sound at high output, and a refrigerator including the same.

2. Description of Related Art

Refrigerators are home appliances that keep food fresh and include a storage compartment for storing food and a cold air supply device including a compressor for supplying cold air to the storage compartment, etc. Recently, as refrigerators have become more diverse in size and function, refrigerators with double doors as well as refrigerators with separate upper and lower doors are being developed. Furthermore, in addition to traditional food storage purposes, refrigerators are also developing into complex devices with additional functions. Representative additional functions include a communication function as an Internet of Things (IoT) device and a speaker function to output various sounds and information. At this time, a speaker included in a refrigerator is not allowed to take up much space due to the nature thereof, and miniaturization and high output are required while maintaining the design framework of existing refrigerators.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a refrigerator comprising a speaker device for the refrigerator.

Additional aspects will be set forth in part in the description which follows and, in part, will be apparent from the description, or may be learned by practice of the presented embodiments.

In accordance with an aspect of the disclosure, a refrigerator is provided. The refrigerator includes a main body, a storage compartment, a door configured to open and close the storage compartment, and a speaker device embedded in the door, wherein the door includes at least one upper door and at least one lower door, and wherein the speaker device includes at least one first speaker facing a first direction that is a user handle space direction and configured to output sound in a full-range frequency band, and at least one second speaker facing a second direction that is a door inner wall surface direction as a direction different from the first direction and configured to output sound in a full-range frequency band.

In accordance with another aspect of the disclosure, a refrigerator is provided. The refrigerator includes a main body, a storage compartment, a door configured to open and close the storage compartment, and a speaker device embedded in the door, wherein the door includes at least one upper door and at least one lower door, And wherein the speaker device includes at least one first speaker configured to output high-band sound facing a first direction that is a door handle direction, at least one second speaker configured to output low-band sound facing a second direction that is a refrigerator door inner wall surface direction, and a passive radiator arranged in a rear side of the second speaker and facing a third direction that is a direction opposite to the second direction.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
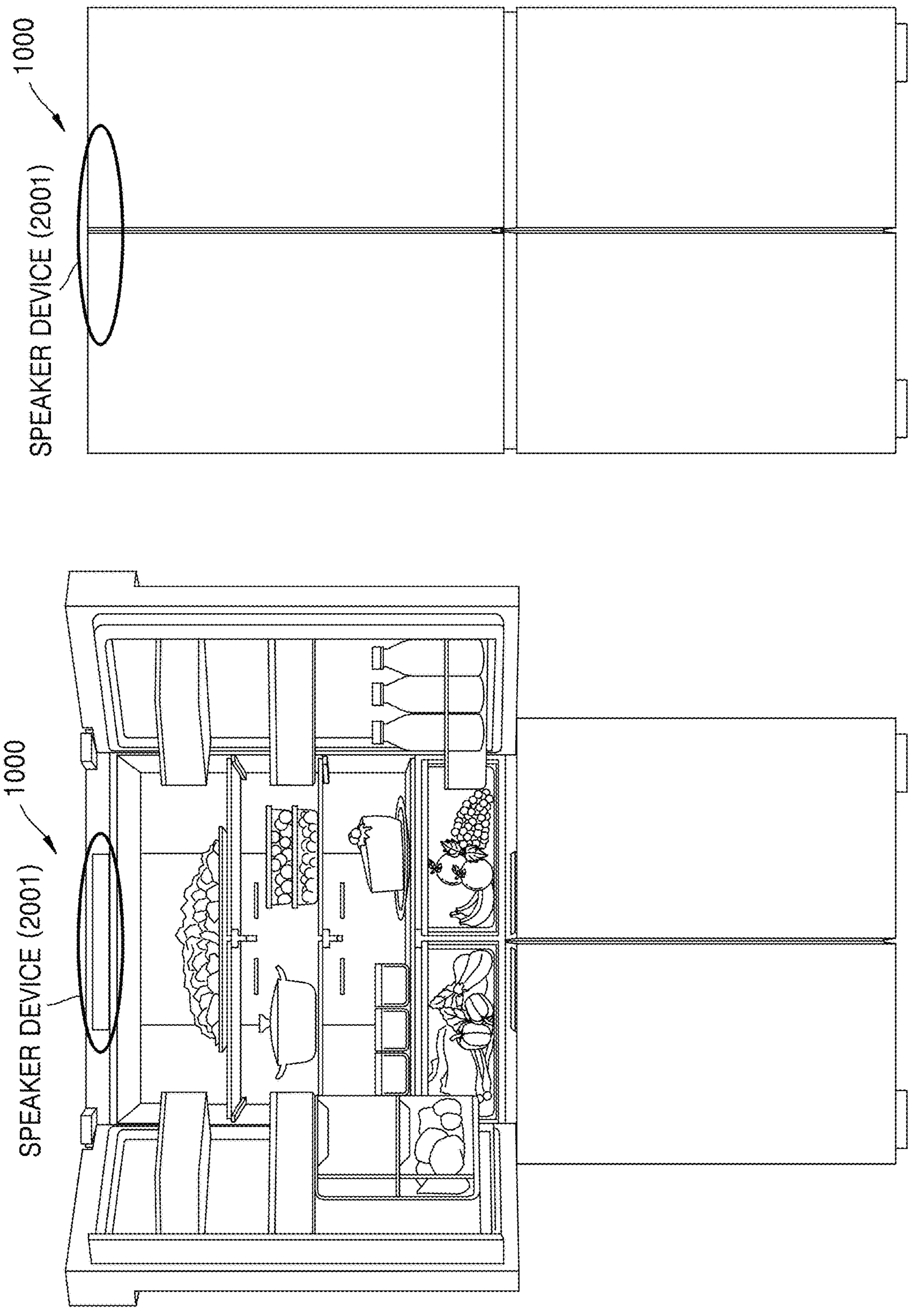
FIG. 1 is a front side view showing that a speaker is installed in an upper portion of a refrigerator according to an embodiment of the disclosure.

The following description with reference to the accompanying drawings is provided to assist in a comprehensive understanding of various embodiments of the disclosure defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

When a part may "include" a certain constituent element, unless specified otherwise, it may not be construed to exclude another constituent element but may be construed to further include other constituent elements. Furthermore, terms such as " . . . portion," " . . . module," and the like stated in the disclosure may signify a unit to process at least one function or operation and the unit may be embodied by hardware, software, or a combination of hardware and software In the disclosure, the expressions such as "A or B," "at least one of A and/or B," or "at least one or more of A and/or B" may include all available combinations of items listed together.

The term "and/or" includes any and all combinations of one or more of the associated listed items.

Terms such as "first" and "second" are used herein merely to describe a variety of constituent elements regardless of an order and/or importance and to distinguish one constituent element from another constituent element, but the constituent elements are not limited by the terms.

It will be understood that when an element (e.g., a first element) is referred to as being "(operatively or communicatively) coupled to/with" or "connected to/with" another element (e.g., a second element), it may be coupled to/with or connected to/with the other element directly or indirectly through one or more other elements (e.g., third elements).

In the disclosure, when an element is "connected," "coupled," "supported," or "contacted" by another element, these elements are directly connected, coupled, supported, or contacted by each other or indirectly connected, coupled, supported, or contacted by each other through a third element.

When an element is formed "on" or "under" another element, it will be understood that the element can be directly on the other component or intervening components may be present thereon.

A refrigerator according to an embodiment of the disclosure may include a main body.

The "main body" may include an inner cabinet, an outer cabinet arranged outside the inner cabinet, and an insulation material provided between the inner cabinet and the outer cabinet.

The "inner cabinet" may include a case, a plate, a panel, or liner to form a storage compartment. The inner cabinet may be formed as one body or may be formed by assembling a plurality of plates. The "outer cabinet" may form the exterior of the main body, and may be coupled to the outside of the inner cabinet to allow an insulation material to be disposed between the inner cabinet and the outer cabinet.

The "insulation material" may insulate the inside of the storage compartment from the outside of the storage compartment to maintain the temperature of the inside of the storage compartment at a set appropriate temperature without being affected by the external environment of the storage compartment. According to an embodiment of the disclosure, the insulation material may include a foam insulation material. After fixing the inner cabinet and the outer cabinet with a jig, etc., a foam insulation material may be molded by injecting urethane foam mixed with polyurethane and a foaming agent between the inner cabinet and the outer cabinet to produce form.

According to an embodiment of the disclosure, the insulation material may additionally include a vacuum insulation material in addition to the foam insulation material, and the insulation material may be configured with only the vacuum insulation material instead of the foam insulation material. The vacuum insulation material may include a core material and an envelope for accommodating the core material and sealing the inside with vacuum or a near-vacuum pressure. The vacuum insulation material may further include an adsorbent that adsorbs a gas and moisture to stably maintain a vacuum state.

However, the insulation material is not limited to the foam insulation material or the vacuum insulation material described above, but may include various materials to be used for insulation.

A refrigerator according to an embodiment of the disclosure may include a storage compartment provided inside the main body to store food.

The "storage compartment" may include a space defined by the inner cabinet. The storage compartment may further include an inner cabinet that defines the space. The storage compartment may include at least one side opened to put in or take out food. The storage compartment may be provided to store "food." The food may include food to eat or drink, in detail, meat, fish, seafood, fruits, vegetables, water, ice, beverages, kimchi, or alcoholic beverages such as wine. However, in addition to food, drugs or cosmetics may be stored in the storage compartment, and there is no limitation in the goods to be stored in the storage compartment.

A refrigerator may include one or more storage compartments. When two or more storage compartments are formed in a refrigerator, the respective storage compartments may have different purposes and may be maintained at different temperatures. To this end, the respective storage compartments may be sectioned by a partition wall including an insulation material. According to an embodiment of the disclosure, the partition wall may be a part of the main body. According to an embodiment of the disclosure, the partition wall may be a separate partition separately provided from the main body and assembled to the main body.

The storage compartment may be provided to be maintained within an appropriate temperature range depending on the purpose, and may include "a refrigerating room," "a freezing room," or "a variable temperature room," which are classified by the purpose and/or the temperature range thereof. The refrigerating room may be maintained at a temperature suitable for keeping food refrigerated, and the freezing room may be maintained at a temperature suitable for keeping food frozen. "Refrigerating" may mean keeping food cold without freezing the same, and as an example, the refrigerating room may be maintained in a range of from 0° C. to 7° C. "Freezing" may mean freezing food or keeping food frozen, and as an example, the freezing room may be maintained in a range of from −20° C. to −1° C. The variable temperature room may be used as any one of the refrigerating room and the freezing room according to a user's selection or regardless of the selection. According to an embodiment of the disclosure, one storage compartment may be provided such that a part of the storage compartment is used as a refrigerating room and the other is used as a freezing room.

The storage compartment may be called by various names, such as "a vegetable room," "a fresh room," "a cooling room," "an ice making room," and the like, in addition to the names of "refrigerating room," "freezing room," "a variable temperature room," and the like. The terms used below, such as "a refrigerating room," "a freezing room," "a variable temperature room," and the like, may be interpreted as having a meaning collectively including storage compartments respectively having corresponding purposes and temperature ranges.

A refrigerator according to an embodiment of the disclosure may include a door configured to open/close one open side of a storage compartment.

The "door" may be configured to seal the storage compartment when the door is closed. The door, like the main body, may include an insulation material to insulate the storage compartment when the door is closed.

A refrigerator according to an embodiment of the disclosure may include a cold air supply device to supply cold air to the storage compartment.

The "cold air supply device" may include machines, devices, electronic devices, and/or a system combining the same, which can generate cold air and guide the cold air to cool the storage compartment.

According to an embodiment of the disclosure, the cold air supply device may generate cold air through a refrigeration cycle including a process of compressing, condensing, expanding, and evaporating a coolant. To this end, the cold air supply device may include a refrigeration cycle device including a compressor, a condenser, an expansion device, and an evaporator to drive the refrigeration cycle.

A refrigerator according to an embodiment of the disclosure may include a machine room in which at least some parts belonging to the cold air supply device are placed.

The "machine room" may be provided to be sectioned and insulated from the storage compartment to prevent transfer of heat generated from components arranged in the machine room to the storage compartment. The inside of the machine room may be configured to link to the outside of the main body to dissipate the heat from the component arranged inside the machine room.

The terms used in the disclosure, such as "a front side," "a rear side," "a top side," "a bottom side," "a lateral side," "a left side," "a right side," "an upper portion," "a lower portion," etc., are defined based on the drawings, and should be interpreted as meaning a relative location, but the terms should not be interpreted as those limiting the shape and location of each component.

Hereinafter, an embodiment of the disclosure is described in detail with reference to the accompanying drawings so as to be easily implemented by one skilled in the art to which the disclosure pertains. However, an embodiment of the disclosure may be implemented in various different forms and is not limited to the embodiment described herein. In the drawings, in order to clearly describe an embodiment of the disclosure, any portion not related to the description is omitted, and throughout the disclosure, the same or similar portions are assigned with the same or similar reference numerals.

Throughout the disclosure, terms, such as a refrigerator apparatus or a refrigerator home appliance, may be interchangeably used with a refrigerator. Furthermore, throughout the disclosure, terms, such as a speaker device or a speaker device for a refrigerator, may be interchangeably used with a speaker device.

The refrigerator is a type of home appliance that supplies cold air generated by a compressor to a storage room to keep various foods fresh for a long period of time. In addition to this long-term preservation function, refrigerators are equipped with various functions, and representative functions include a communication function that configures an internet of things (IoT) network and a function that may output sound through a speaker mounted in the refrigerator. For the communication function, the function may be realized by adding an ultra-small communication chip to a control unit of the existing refrigerator, so there is no space problem. In the case of speakers, however, the larger the speaker, the better the sound quality, and thus, the method and structure of embedding a speaker in the refrigerator so as to implement good sound quality without changing the structure of the existing refrigerator are emerging as an issue.

According to an embodiment of the disclosure, a speaker with a compact structure that can be embedded in a refrigerator is needed. Such a speaker should satisfy the compact structure and also be able to generate sufficient output in both high and low bands within a space where the refrigerator is located.

A refrigerator according to an embodiment of the disclosure includes a main body, a storage compartment, a door capable of opening/closing the storage compartment, and a speaker device embedded in the door, wherein the door includes an upper door and a lower door, and the speaker device includes at least one first speaker facing a first direction that is a user handle space direction and capable of outputting sound in a full-range frequency band, and at least one second speaker facing a second direction that is a door inner wall surface direction as a direction different from the first direction and capable of outputting sound in a full-range frequency band.

In an embodiment of the disclosure, the refrigerator may further include a passive radiator arranged at the opposite side to the at least one second speaker in a third direction opposite to the second direction.

In an embodiment of the disclosure, the speaker device may be installed inside the upper door of the refrigerator, the first direction may be a direction from the upper door to the lower door of the refrigerator, the second direction may be a direction toward a front side of the refrigerator in the upper door, and the third direction may be a direction toward a rear side of the refrigerator.

In an embodiment of the disclosure, the speaker device may be embedded in a vertical direction of the upper door, and may have a first certain space in the second direction between the at least one second speaker and the inside wall surface of the upper door of the refrigerator.

In an embodiment of the disclosure, the width of the first certain space may differ in the vertical direction of the upper door.

In an embodiment of the disclosure, the width of the first certain space may increase downward in the vertical direction of the upper door.

In an embodiment of the disclosure, a second certain space may be provided in the third direction between the passive radiator and an inner wall surface of the upper door, and the width of the second certain space may increase downward in the vertical direction of the upper door.

In an embodiment of the disclosure, the at least one first speaker may be exposed in a direction from the upper door of the refrigerator toward the lower door.

In an embodiment of the disclosure, the speaker device may further include a grill covering a front side of the at least one first speaker.

A refrigerator according to an embodiment of the disclosure includes a main body, a storage compartment, a door capable of opening/closing the storage compartment, and a speaker device embedded in the door, wherein the door includes an upper door and a lower door, the speaker device includes at least one first speaker for high-band sound facing a first direction that is a door handle direction, at least one second speaker for low-band sound facing a second direction that is a refrigerator door inner wall surface direction, and a passive radiator arranged in a rear side of the second speaker and facing a third direction that is a direction opposite to the second direction.

In an embodiment of the disclosure, the speaker device may be installed inside the upper door of the refrigerator, the first direction may be a direction from the upper door to the lower door, the second direction may be a direction toward a front side of the refrigerator in the upper door, and the third direction may be a direction toward a rear side of the refrigerator.

In an embodiment of the disclosure, the speaker device may be embedded in a vertical direction of the upper door, and may have a first certain space in the second direction between the at least one second speaker and the inside wall surface of the upper door.

In an embodiment of the disclosure, the width of the first certain space between the at least one second speaker and an inner wall surface of the upper door may increase downward in the vertical direction of the upper door.

In an embodiment of the disclosure, a second certain space may be provided in the third direction between the passive radiator and an inner wall surface of the upper door, and the width of the second certain space may increase downward in the vertical direction of the upper door.

In an embodiment of the disclosure, the at least one first speaker may be exposed in a direction from the upper door toward the lower door.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is a front side view showing that a speaker is installed in an upper portion of a refrigerator according to an embodiment of the disclosure.

Referring to FIG. 1, a speaker device 2001 is mounted in an upper portion of a refrigerator 1000. In this state, the speaker device 2001 may be equipped with a short-range communication function such as a Bluetooth function, and as shown in the left front side view of FIG. 1, when a door in the upper portion of the refrigerator 1000 is open, smooth sound propagation is available, but as shown in the right front side view of FIG. 1, when the door in the upper portion of the refrigerator 1000 is closed, the door may serve as a sort of obstacle in the sound propagation, so that smooth sound propagation may not be achieved.

Figure 2:
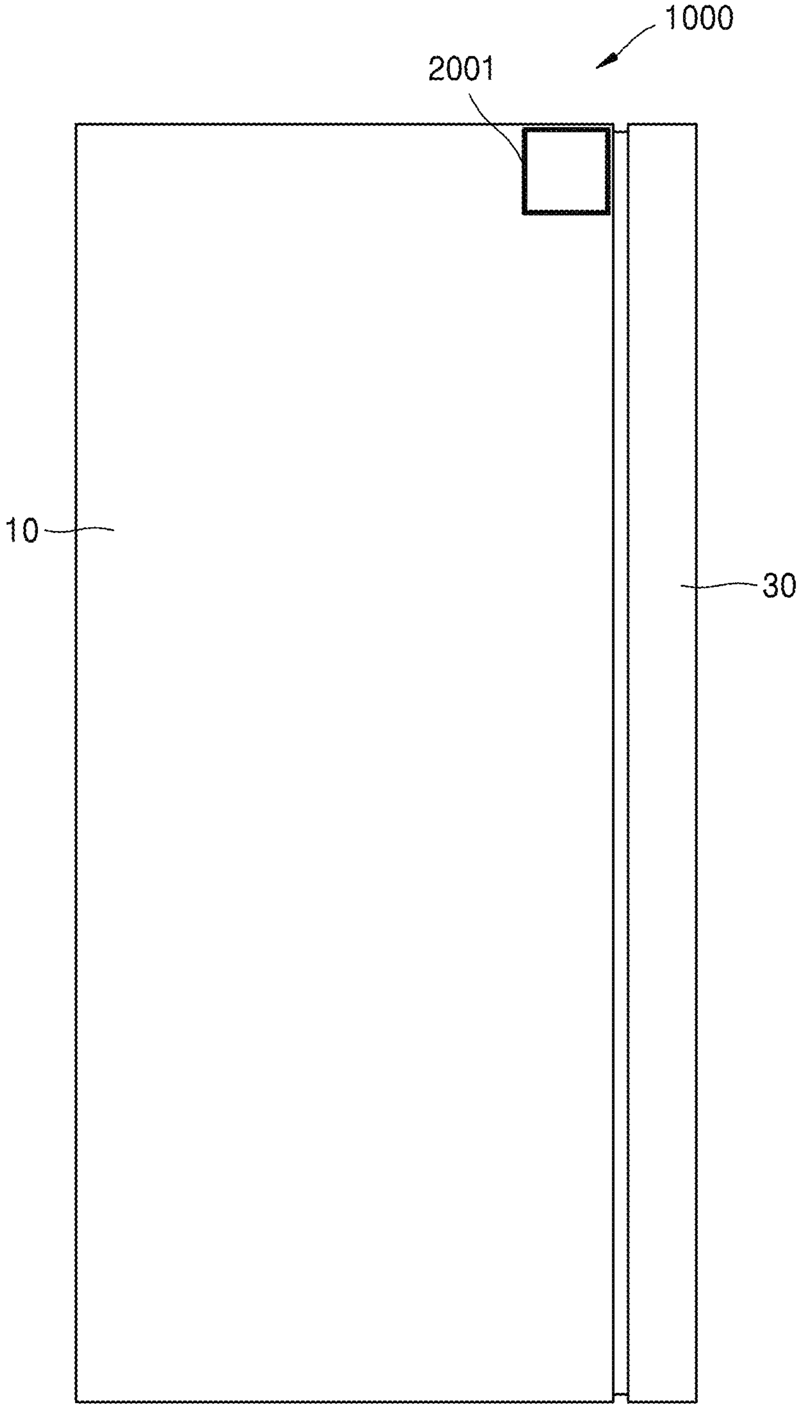
FIG. 2 is a side view showing that a speaker is installed in an upper portion of a refrigerator according to an embodiment of the disclosure.

FIG. 2 is a side view showing that the speaker is installed in the upper portion of the refrigerator according to an embodiment of the disclosure.

Referring to FIG. 2, as an upper door blocks the front side direction of a speaker, sound propagation is hindered, to avoid such hindrance, the speaker may be installed to protrude upward from a main body 10 of the refrigerator 1000. However, installing the speaker to protrude upward from the refrigerator main body is not recommended in terms of design, and moreover, as households equipped with a refrigerator having a tight upper portion increase, a result of increased refrigerator height is brought, and thus, it may also cause difficulties in installing the refrigerator.

Considering such difficulties, when a speaker is installed in the refrigerator 1000, the speaker may be installed in a lower end of a refrigerator door. When the speaker is installed in the lower end of the refrigerator door, sound quality may be limited due to a lot of reflected sound, and thus, there is a case in which the speaker is installed facing the front side of the refrigerator 1000. However, when the speaker faces the front side, a separate perforated space through which sound of the speaker can be emitted is necessary in the front side, which causes design-related issues, and there may be a disadvantage of the thickness of the refrigerator door increasing for heat dissipation design.

Figure 3:
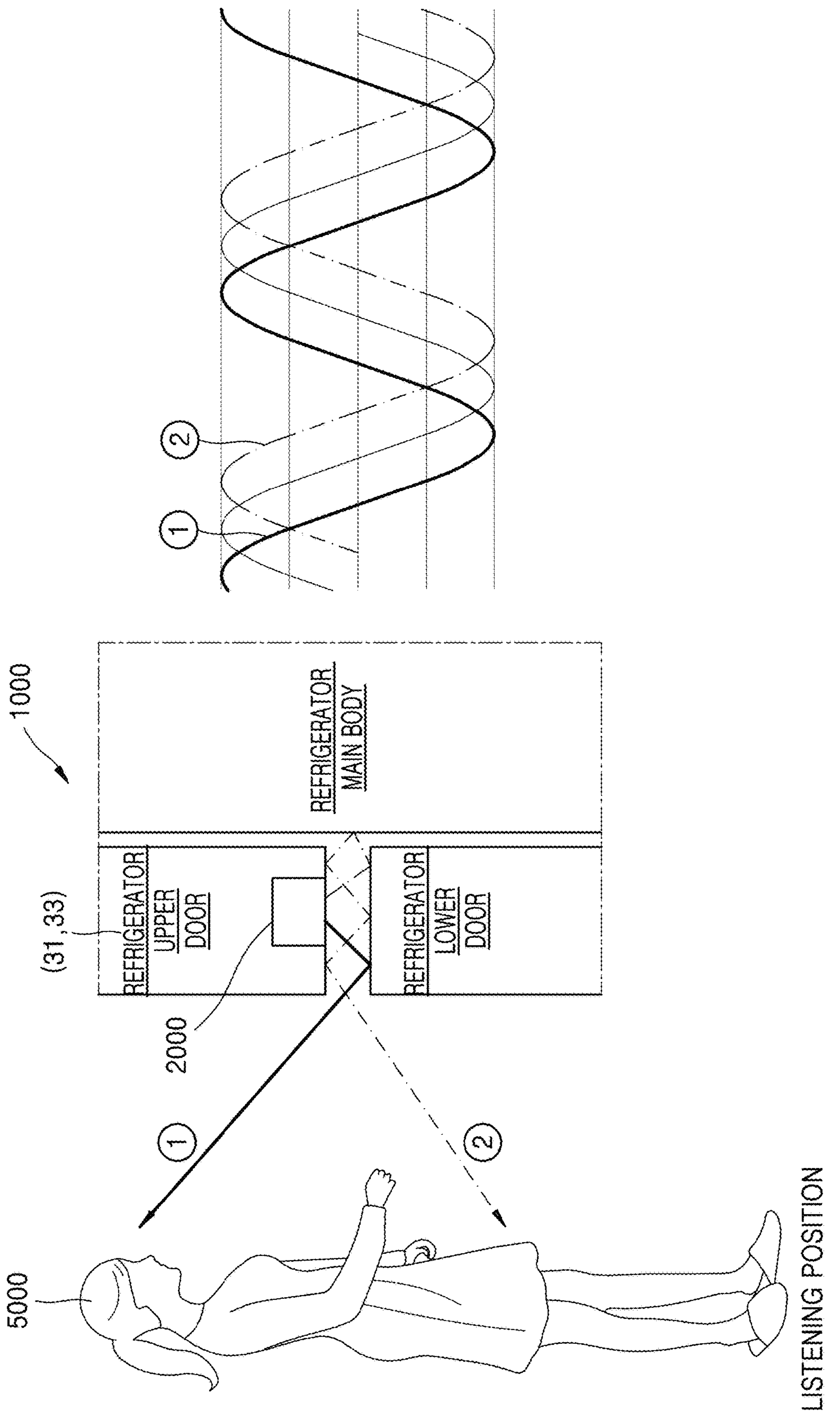
FIG. 3 is a view illustrating a sound reflection path of a speaker of a refrigerator according to an embodiment of the disclosure.

FIG. 3 is a view illustrating a sound reflection path of the speaker of the refrigerator according to an embodiment of the disclosure.

Referring to FIG. 3, when a speaker device 2000 is located in lower ends of refrigerator upper doors 31 and 33, sound that is directly output to the front side from the speaker device 2000 and sound that is output by being internally reflected are transferred in combination to a listener 5000. At this time, echoing occurs due to the door thickness and structure of the refrigerator 1000 so that sound quality becomes dull.

To prevent such a case, sound is mainly divided into a high frequency range of 3 kHz or more (generally 4 kHz to 20 kHz) and a low frequency range of less than 3 kHz (generally 20 Hz to 100 Hz), and analyzed. Sound is transferred by waves in air. The high frequency sound has a relatively short wavelength and performs a ray motion close to light. In contrast, the low frequency sound has a relatively long wavelength so as to have increased waves and diffraction like water waves. In other words, the low frequency sound exhibits strong diffraction properties such as water waves, rather than the properties of reflected waves such as light, and when the low frequency sound collides against an obstacle smaller than a wavelength thereof, a diffraction phenomenon that changes a traveling direction without being easily reflected occurs. Accordingly, the low frequency sound generated by the speaker flows around a wall surface or ceiling, like water, and is emitted. In particular, the larger the wavelength, the more smoothly the diffraction occurs. Accordingly, for the low frequency sound, sound transmission is smooth even when there is a lot of reflected sound, but for the high frequency sound, the more sound reflection occurs, the more problems arise in sound transmission. Accordingly, a sound traveling direction is important to transmit high frequency sound well. In contrast, to transmit sound in a low frequency range, the size of a speaker's diaphragm—the area the speaker can occupy—is more important than the direction in which the sound travels. Considering the above points, when a speaker is installed to be embedded in a refrigerator, by designing one of speakers to transmit sound in an open structure not in a structure with a lot of reflection, high frequency sound output properties may become stronger, and by installing the other speaker in a structure relatively with a lot of reflection, low frequency sound output properties may become stronger.

The speaker device installed in a refrigerator according to an embodiment of the disclosure may include two or more speakers, each speaker being a speaker capable of outputting sound in a full-range (full band), in which one of the speakers may be arranged in a place where high-band sound output properties are strong, another speaker may be arranged in a place where low-band sound output properties are strong, and the speaker device may include a passive radiator to reinforce the low-band sound output.

According to an embodiment of the disclosure, the speaker device installed in a refrigerator may include two or more speakers, in which one of the speakers may be a speaker for a high band, another speaker may be a speaker for a low band, and a passive radiator may be included to reinforce the low-band sound output. In an embodiment of the disclosure, the high band speaker may be a tweeter, and the low band speaker may be a woofer.

Figure 4:
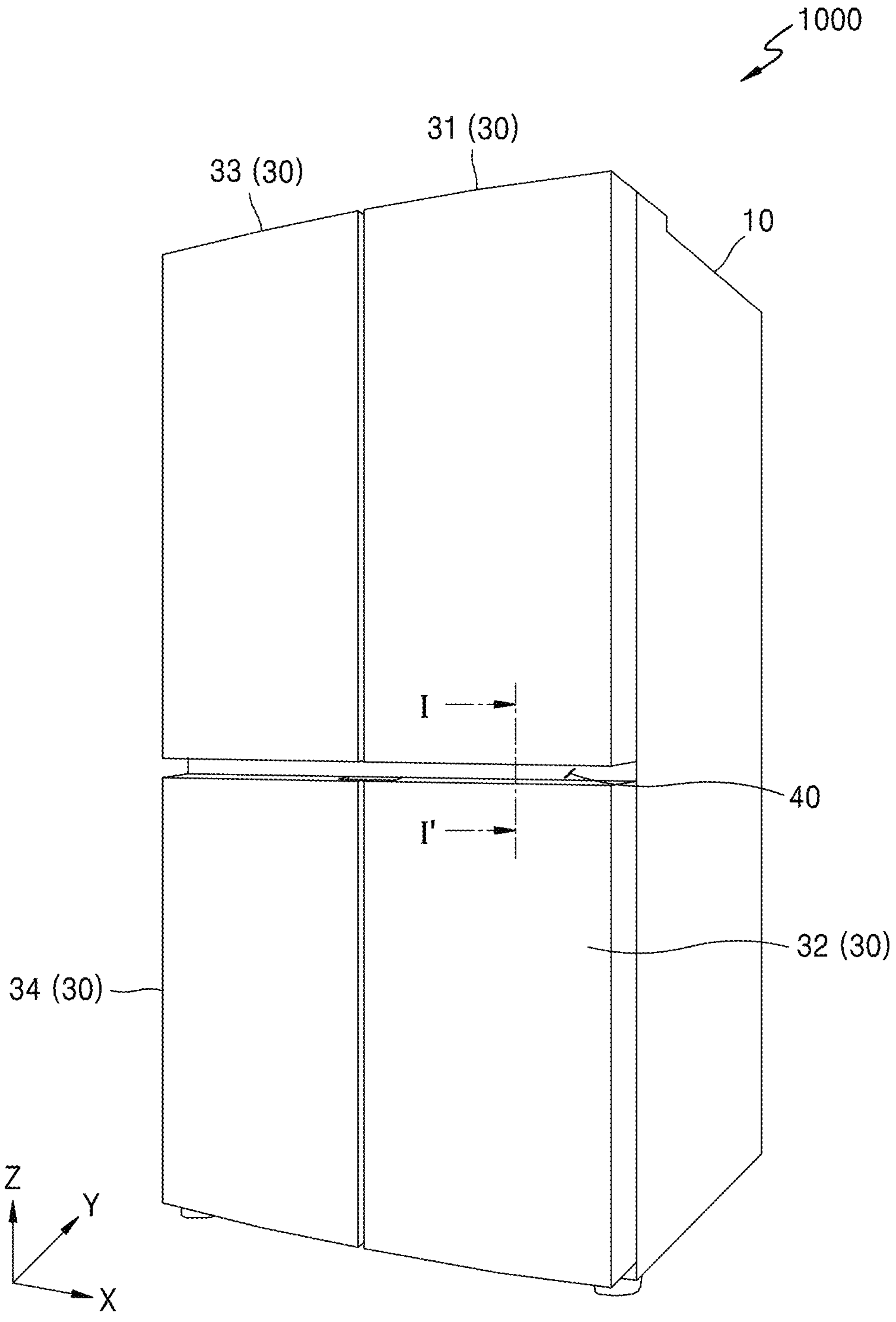
FIG. 4 is a schematic perspective view of a refrigerator according to an embodiment of the disclosure.

FIG. 4 is a schematic perspective view of the refrigerator according to an embodiment of the disclosure.

Figure 5:
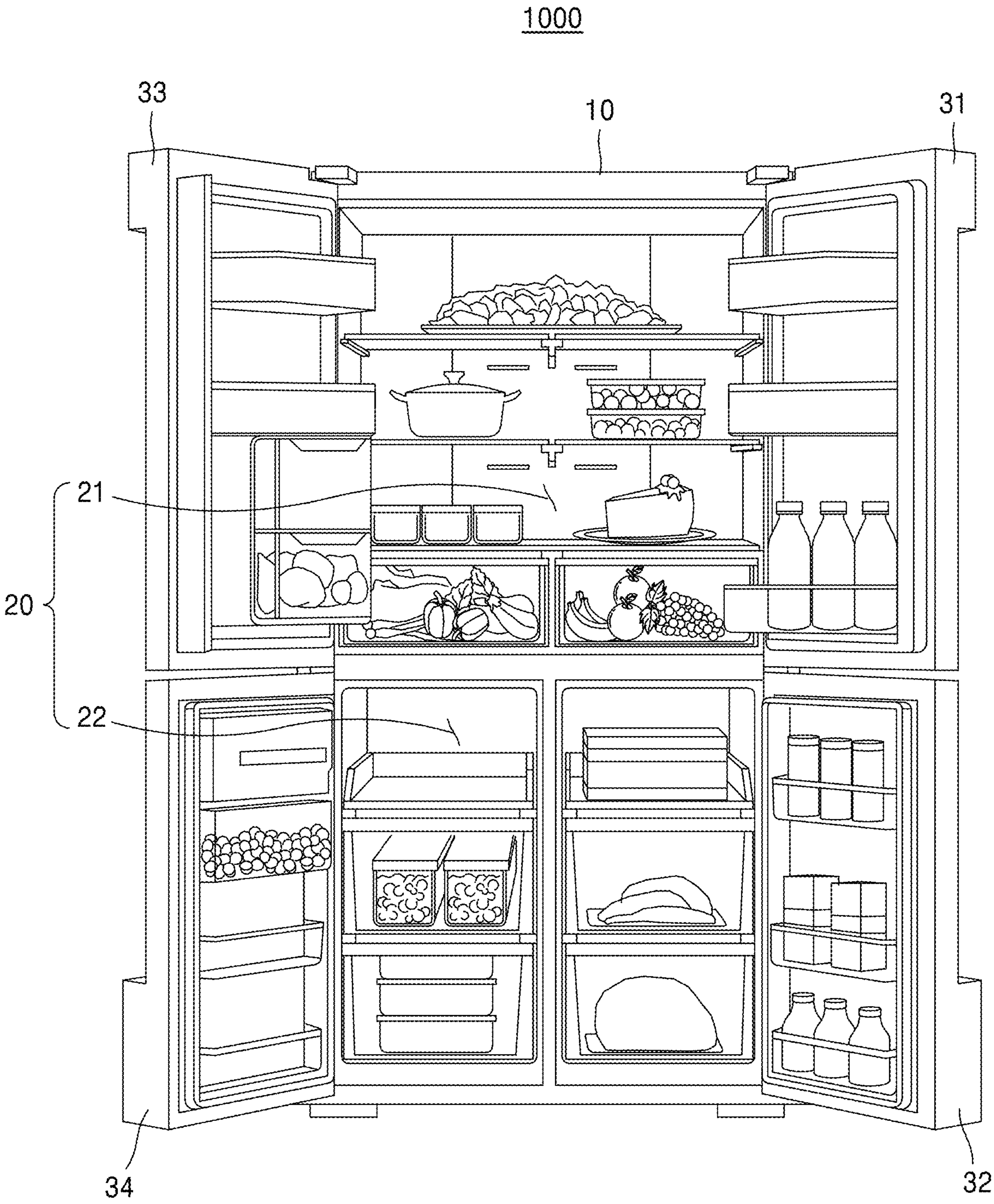
FIG. 5 is a front side view showing an interior of a refrigerator according to an embodiment of the disclosure.

FIG. 5 is a front side view showing an interior of the refrigerator according to an embodiment of the disclosure.

Referring to FIGS. 4 and 5, the refrigerator 1000 according to an embodiment of the disclosure may include doors 31, 32, 33, and 34 capable of opening/closing the main body 10 and a storage compartment 20.

Although the refrigerator 1000 according to FIG. 4 illustrates a door 30 includes four doors, the number of the door 30 is not limited thereto, and an upper door 31 and a lower door 32 in the right side of the refrigerator 1000 may be configured as one door, and an upper door 33 and a lower door 34 in the left side of the refrigerator 1000 may be configured as one door. Furthermore, the number of refrigerator doors may be greater or less than four. Furthermore, the position of the door 30 may be variously changed. Depending on the arrangement of the door 30 and the storage compartment 20, the refrigerator 1000 may be a French door type refrigerator, a side-by-side type refrigerator, and the like. A handle area 40 that is a space into which a user puts a hand to open/close the door 30 may exist between the doors 31, 32, 33, and 34. According to an embodiment of the disclosure, the speaker device 2000 may be embedded in or attached to the lower portions of the upper doors 31 and 33 that are arranged in the front upper portion of the main body 10. According to an embodiment of the disclosure, the speaker device 2000 may be embedded in or attached to the upper portions of the lower doors 32 and 34 that are arranged in the front lower portion of the main body 10, Alternatively, according to an embodiment of the disclosure, the speaker device 2000 may be embedded in or attached to the side portions of the upper doors 31 and 33 or the lower doors 32 and 34 of the main body 10.

The speaker device 2000 is a device to convert an electrical signal into a sound wave signal and may output various sounds. The structure of embedding the speaker device 2000 in the lower portion of the upper door 31 is described below.

Referring to FIG. 5, the refrigerator 1000 may include the storage compartment 20 capable of keeping various foods refrigerated or frozen. The storage compartment 20 may be divided into a refrigerating room 21 in which food is kept cold at a temperature above zero and a freezing room 22 in which various foods are kept at a temperature below zero. The storage compartment 20 may further include a variable temperature room suitable for the properties of food to be kept.

Although it is not illustrated in FIGS. 4 and 5, the refrigerator 1000 may further include devices such as a compressor, a condenser, an expander, an evaporator, and the like to constitute a refrigeration cycle.

Figure 6:
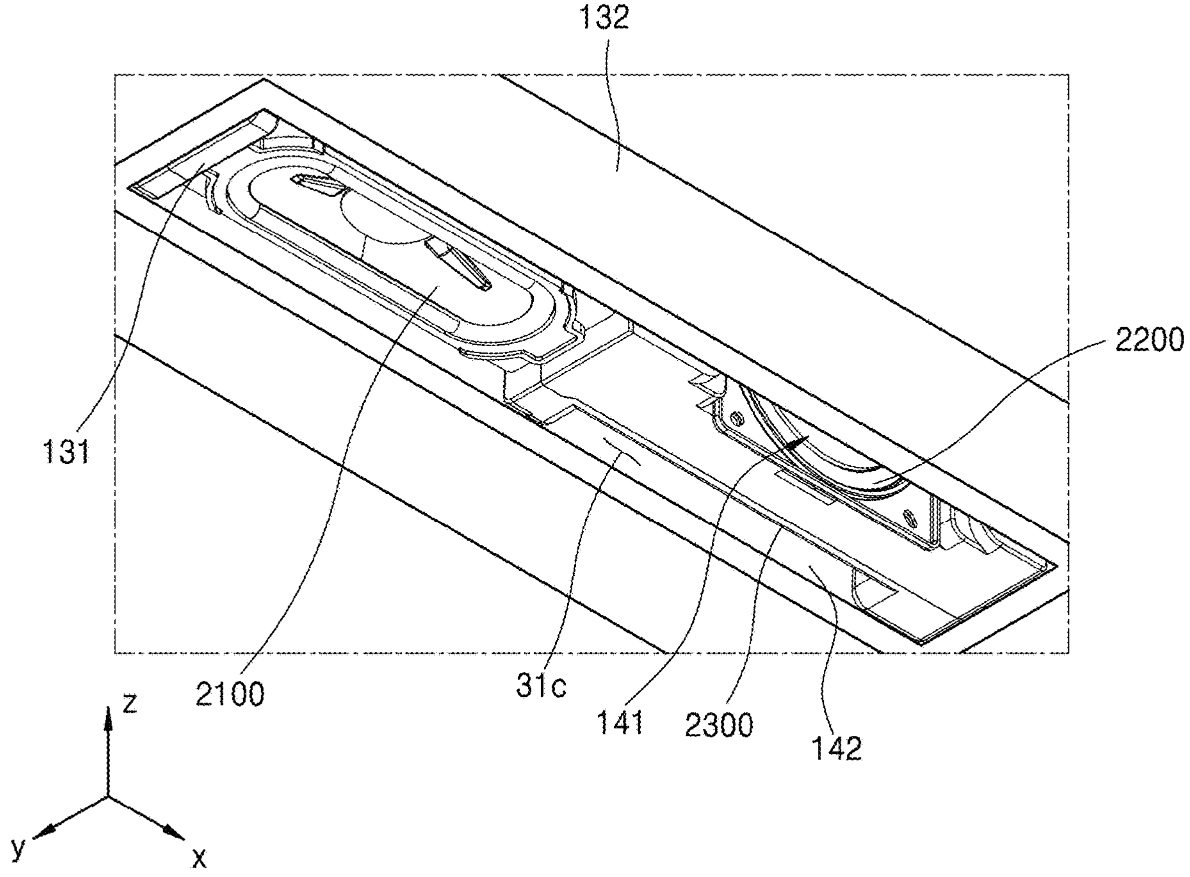
FIG. 6 is a perspective view showing a lower portion of a door of a refrigerator according to an embodiment of the disclosure.

FIG. 6 is a perspective view of a lower portion of a speaker embedded in the door 30 of a refrigerator according to an embodiment of the disclosure.

The speaker device 2000 according to an embodiment of the disclosure may be arranged to be embedded in the lower portion of any one of the upper doors 31 and 33, but the disclosure is not limited thereto. According to an embodiment of the disclosure, the speaker device 2000 may be arranged to be embedded in the upper portion of any one of the lower doors 32 and 34. However, when the speaker device 2000 is located in the lower doors 32 and 34, as food falls down during the opening/closing operation of the upper doors 31 and 33, the speaker device 2000 may be damaged. Thus, it may be preferable to embed the speaker device 2000 in the lower portion of the upper door, but the speaker device 2000 may still be installed in the lower door for spatial issue or other reasons. Furthermore, the speaker device 2000 may be embedded or attached such that any one of a plurality of speakers faces the handle area 40 of the door, or the speaker device 2000 may be embedded in or attached to the lateral side of the door.

In order to emit high-quality low-range sound, the wider the speaker area is, the more advantageous it is. Accordingly, the area may be limited to install the speaker in the door of the refrigerator 1000. Accordingly, according to an embodiment of the disclosure, a speaker embedded structure may be designed such that sound with a reinforced low frequency range is output to an inner hide surface rather than the door surface exposed to the outside. According to such a design, a lot of sound reflection occurs on the inner wall of the refrigerator, sound in a low frequency range has a limited sound damage due to reflection. However, considering space, a speaker arranged inside the door may mainly output low frequency sound, and as high frequency sound has relatively a lot of sound damage due to reflection, a speaker arranged to be exposed as much as possible in the handle area 40 may mainly output high frequency sound. At this time, to reinforce the low frequency sound, a passive radiator 2300 may be additionally added to the speaker device 2000. The passive radiator 2300 is a base sound reinforcement device that assists a second speaker 2200, such as a woofer, having a relatively small area to have an effect of a large woofer. However, this is for cases in which the speaker device 2000 is manufactured by being divided into a speaker for high frequency sound and a speaker for low frequency sound. When the speakers provided in the speaker device 2000 are all speakers covering a full-range (full band) frequency band, as described above, depending on the structure in which the speaker device 2000 is embedded, the speaker arranged inside the door may output sound with a reinforced low frequency range, and the speaker arranged to be exposed to the handle area 40 may output sound with a reinforced high frequency range in which relatively a lot of sound damage occurs due to reflection. The full-range (full band) frequency band may include, but not limited to, a frequency range (a frequency band) including a high frequency range (corresponding to high frequency sound and a low frequency range (corresponding to low frequency sound). A speaker covering a full-range frequency band means a single speaker capable of outputting not only sound in a high frequency range but also sound in a mid and low frequency range.

The speaker device 2000 according to an embodiment of the disclosure may include a first speaker 2100 arranged to output sound directly to the handle area 40 and the second speaker 2200 arranged to output sound to a space between an inner wall 31*c* of the door and the speaker device 2000. In an embodiment of the disclosure, the first speaker 2100 and the second speaker 2200 may each be a speaker capable of outputting sound in a full-range frequency band including both of a high band and a mid and low band. In an embodiment of the disclosure, the first speaker 2100 may be a speaker for a high frequency range, and the second speaker 2200 may be a speaker for a low frequency range. For example, the first speaker 2100 may be a tweeter speaker that mainly outputs sound in a frequency band of 3 kHz or more, and the second speaker 2200 may be a woofer speaker that mainly outputs sound in a frequency band of 3 kHz or less. According to an embodiment of the disclosure, the speaker device 2000 may additionally include the passive radiator 2300 arranged opposite to the second speaker 2200. This is an example, and the locations of the passive radiator 2300 and the second speaker 2200 may be switched with each other. In an embodiment of the disclosure, the second speaker 2200 and the passive radiator 2300 may emit sound through a space between the inner wall 31*c* of the door and the speaker device 2000.

In order to produce optimal sound quality in a limited space, such as the door 30 of a refrigerator, when a low band speaker and a high band speaker are separately provided, and considering sound propagation properties, two speakers classified by a method of direct reflection and indirect reflection are installed in one speaker device, overall sound volume is necessarily reduced. In particular, when two speakers in the speaker device 2000 are classified into a woofer and a tweeter, overall output has a limitation, and in the houses with a large and wide space, it is difficult to allow sound output from the speaker device 2000 of the refrigerator 1000 to be transmitted far so that there is a need to use a separate speaker.

However, according to an embodiment of the disclosure, to satisfy both quality and quantity of sound while being installed in a limited space such as the door 30 of a refrigerator, the speaker device 2000 may use the first speaker 2100 that is a full-range speaker and the second speaker 2200 that is a full-range speaker. In other words, according to an embodiment of the disclosure, in the speaker device 2000, one of the two full-range speakers faces a first direction—for example, a direction toward the handle area 40 in the door 30 of a refrigerator—, and the other speaker faces a second direction—for example, a wall surface direction when vertically embedded in the door 30 of a refrigerator—. Accordingly, the overall output of the speaker device 2000 increases so that the overall sound volume of the speaker device 2000 is increased.

When the first speaker 2100, as a downward directional speaker facing the first direction, is located in the door 30 of a refrigerator, reflection is minimized so that a high band of sound may be reinforced, and the second speaker 2200, as a speaker located in the lateral side facing the second direction, may have a reinforced low band. In an embodiment of the disclosure, the passive radiator 2300 may be installed in the rear side of the second speaker 2200 located in the lateral side.

In an example in which the speaker device 2000 is embedded in the lower portion of the upper door 31, one side of the speaker device 2000 may be exposed to the handle area 40. Accordingly, sound output from the speaker device 2000 may be emitted to the outside through the handle area 40. Furthermore, to protect a speaker front side, a grill may be mounted in the first speaker 2100 to be exposed to the handle area 40 as one side of the speaker device 2000 is exposed to the handle area 40. In an embodiment of the disclosure, the speaker device 2000 of FIG. 6 may include an exposed surface 131 in which the speaker device 2000 is exposed to the handle area 40 of the refrigerator 1000, and a lateral surface 132 having an area greater than the area of the exposed surface 131. A first space 141 may exist between the second speaker 2200 and the lateral surface 132, and a second space 142 may exist between the passive radiator 2300 and an opposite lateral side.

Figure 7:
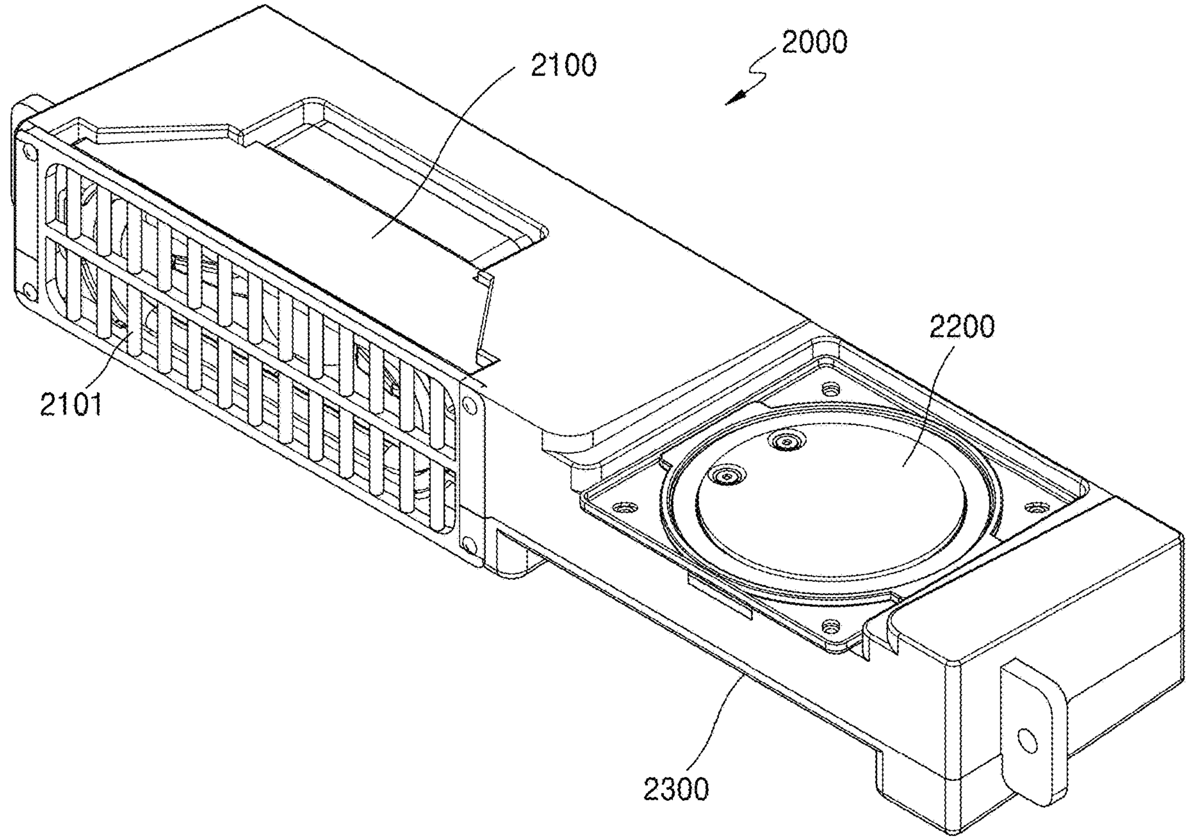
FIG. 7 is a perspective view showing that a grill is installed on a first speaker according to an embodiment of the disclosure.

FIG. 7 is a perspective view showing that a grill is installed on the first speaker according to an embodiment of the disclosure.

Referring to FIG. 7, in the speaker device 2000, a grill 2101 is attached to the front side of the first speaker 2100. The grill 2101 may protect the front side of the first speaker 2100 from being physically damaged by a touch of a user's hand as the first speaker 2100 is exposed to the handle area 40 of the refrigerator 1000.

Figure 8:
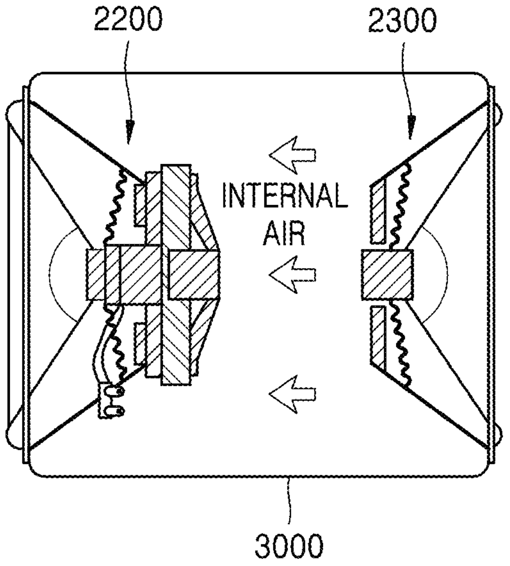
FIG. 8 is a cross-sectional view showing a structure in which a second speaker and a passive radiator are installed, according to an embodiment of the disclosure.

FIG. 8 is a cross-sectional view showing a structure in which the second speaker and the passive radiator are installed, according to an embodiment of the disclosure.

Basically, the passive radiator 2300 is a recoil device. Referring to FIG. 8, when the second speaker 2200 is mounted in a sealed speaker box (enclosure 3000), the physical forward/backward motion of the second speaker 2200 affects the internal air pressure of the enclosure 3000. When the passive radiator 2300 is installed in the same enclosure 3000, due to a change in internal air pressure, the passive radiator 2300 starts to move back and forth as if the passive radiator 2300 were a driver speaker. When the passive radiator 2300 moves, the passive radiator 2300 generates a sound frequency as the second speaker 2200 that is a driver moves, thereby assisting the second speaker 2200 to output deeper sound. Referring to FIG. 8, when the passive radiator 2300 is located at the opposite side to the second speaker 2200, the passive radiator 2300 may serve as a sound assistant to the second speaker 2200 more effectively by the internal air pressure change.

Hereinafter, a structure of the speaker device 2000 embedded in the door 30 of a refrigerator according to an embodiment of the disclosure is described.

Figure 9:
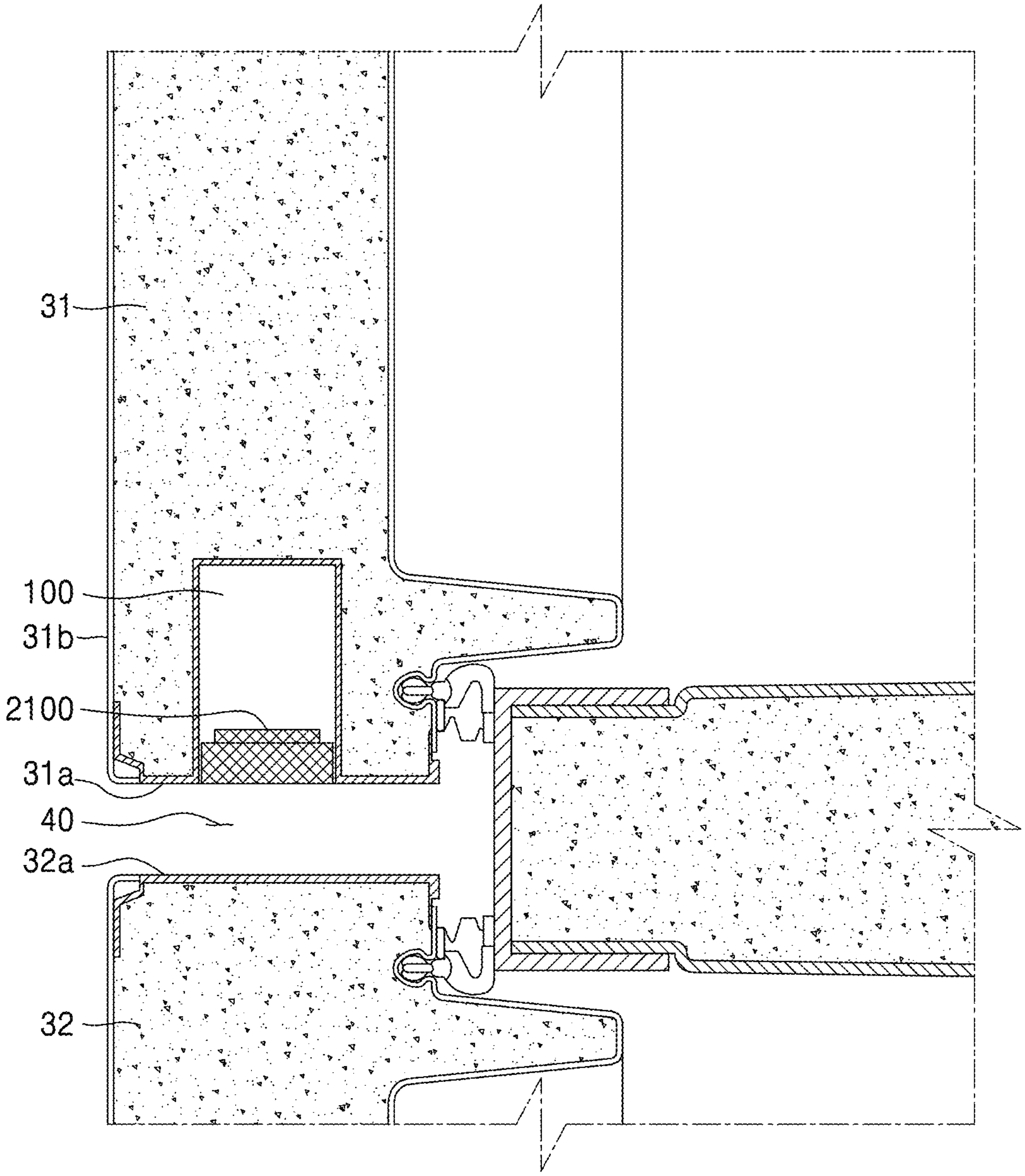
FIG. 9 is a cross-sectional view of a first speaker taken along a line I-I' of FIG. 4, according to an embodiment of the disclosure.

FIG. 9 is a cross-sectional view of the first speaker taken along a line I-I' of FIG. 4, according to an embodiment of the disclosure.

Referring to FIG. 9, the first speaker 2100 may be arranged to face a top side 32*a* of the lower door 32 from a lower surface 31*a* of the upper door 31 of the refrigerator 1000 and may directly output sound to the handle area 40 formed between the lower surface 31*a* of the upper door 31 and the top side 32*a* of the lower door 32.

Figure 10:
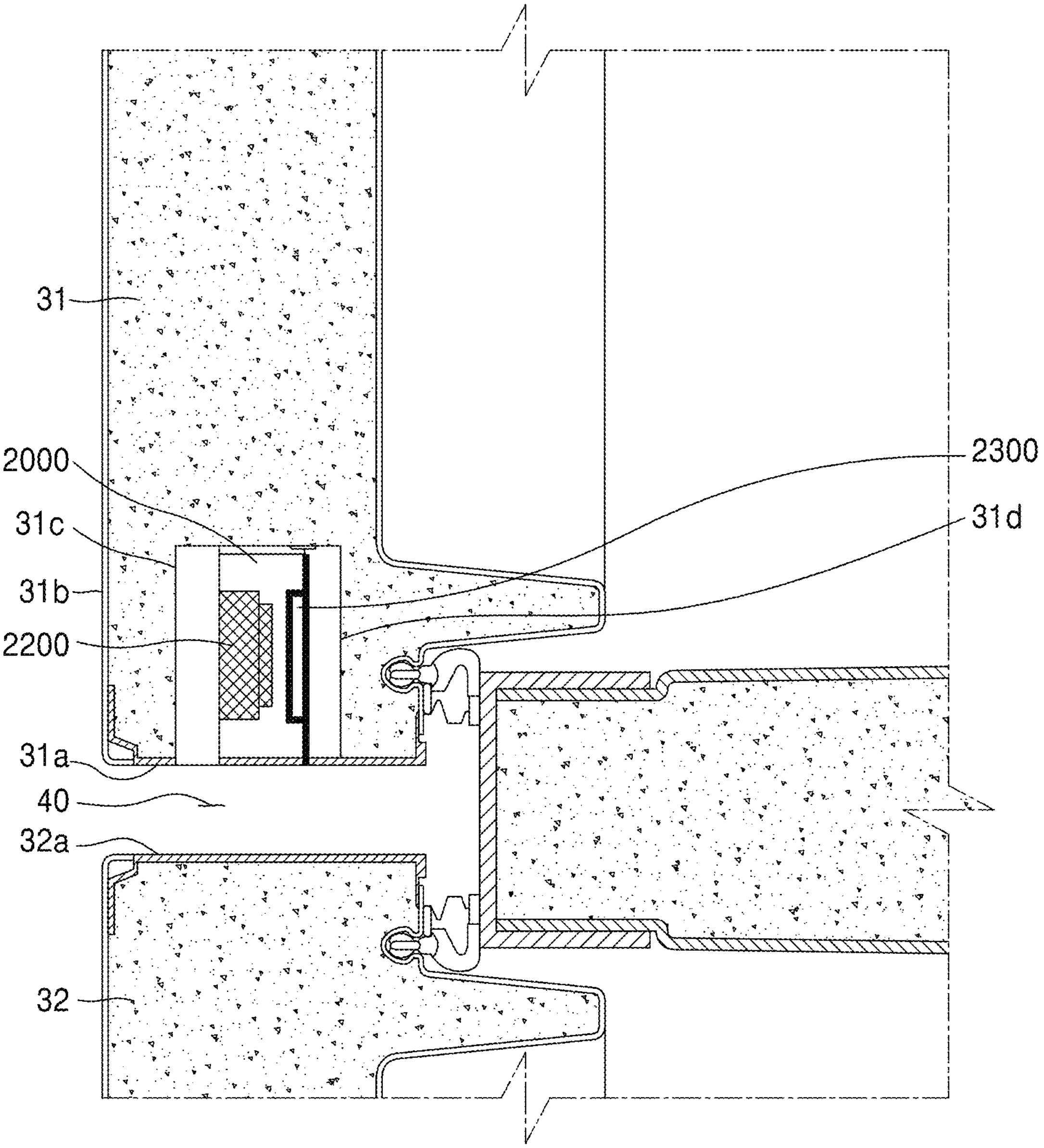
FIG. 10 is an enlarged cross-sectional view of a second speaker and a passive radiator taken along the line I-I' of FIG. 4, according to an embodiment of the disclosure.

FIG. 10 is an enlarged cross-sectional view of a second speaker and a passive radiator taken along the line I-I' of FIG. 4, according to an embodiment of the disclosure.

To illustrate the cross-sectional view of the second speaker, it should be understood that the line I-I' of FIG. 4 may be slightly shifted in a horizontal direction of the refrigerator 1000, unlike the line I-I' applied with reference to FIG. 9. Referring to FIG. 10, the second speaker 2200 may be embedded in the upper door 31 to face the inner wall 31*c* of the upper door 31, and a space formed between the second speaker 2200 and the inner wall 31*c* of the upper door 31 may be linked to (extended to) the handle area 40. Likewise, the passive radiator 2300 may be embedded in the upper door 31 to face an inner wall 31*d* opposite to the inner wall 31*c* of the upper door 31. A space formed between the passive radiator 2300 and the opposite inner wall 31*d* may be linked to (extended to) the handle area 40.

Figure 11:
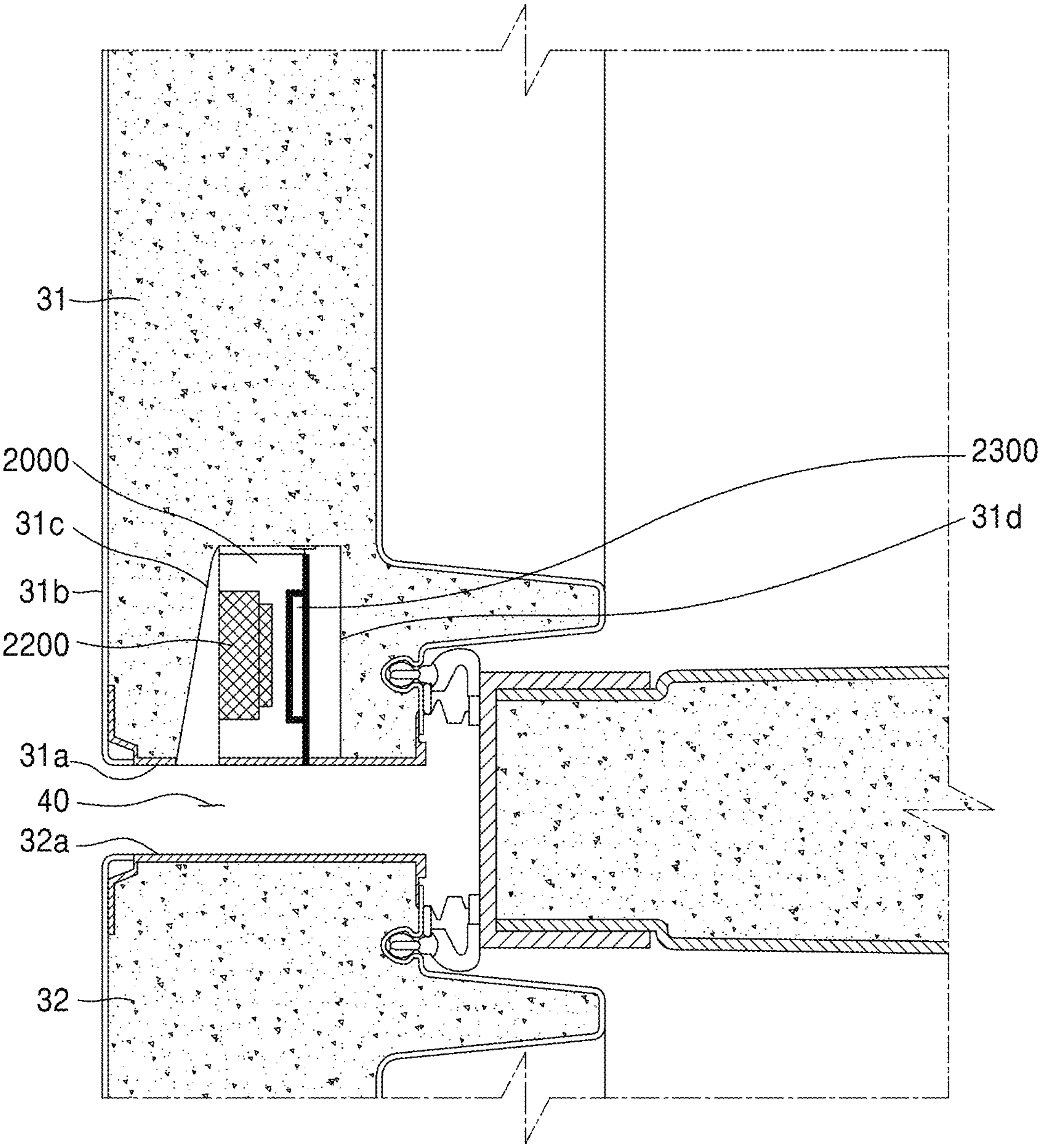
FIG. 11 is another enlarged cross-sectional view of the second speaker and the passive radiator taken along the line I-I' of FIG. 4, according to an embodiment of the disclosure.

FIG. 11 is another enlarged cross-sectional view of the second speaker and the passive radiator taken along the line I-I' of FIG. 4, according to an embodiment of the disclosure.

Referring to FIG. 11, a difference from FIG. 10 is that the width of a space between the inner wall 31*c* that the second speaker 2200 faces and the second speaker 2200 differs depending on the depth of the upper door 31. Referring to FIG. 11, as the inner wall 31*c* becomes wider toward the handle area 40, sound output to the handle area 40 may be effectively generated.

Figure 12:
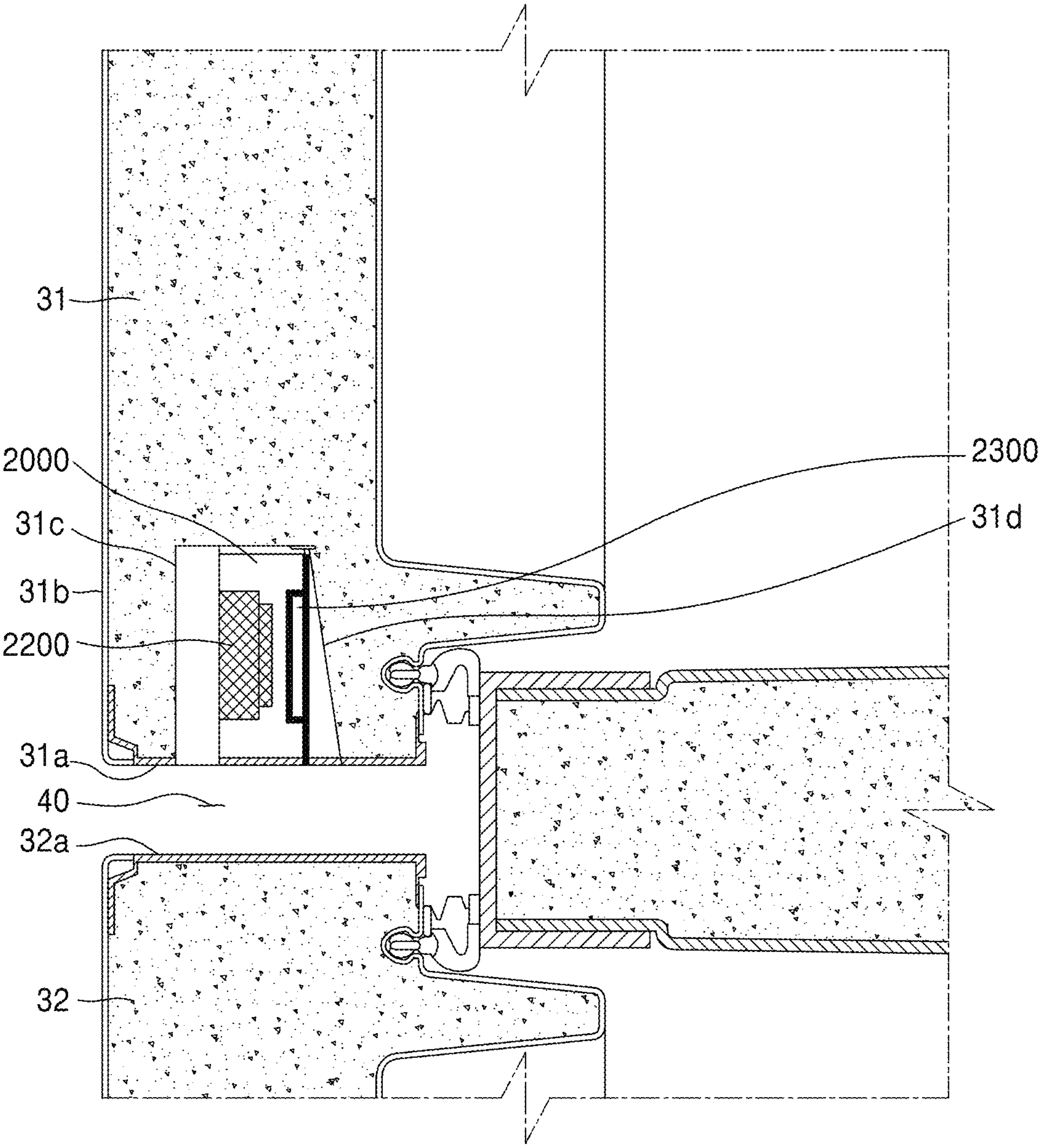
FIG. 12 is another enlarged cross-sectional view of the second speaker and the passive radiator taken along the line I-I' of FIG. 4, according to an embodiment of the disclosure.

FIG. 12 is another enlarged cross-sectional view of the second speaker and the passive radiator taken along the line I-I' of FIG. 4, according to an embodiment of the disclosure.

Referring to FIG. 12, a difference from FIG. 10 is that the width of a space between the inner wall 31*d* that the passive radiator 2300 faces and the passive radiator 2300 differs depending on the depth of the upper door 31. Referring to FIG. 12, as the inner wall 31*d* becomes wider toward the handle area 40, diffraction of sound may be increased and sound output toward the handle area 40 may be more effectively generated.

Figure 13:
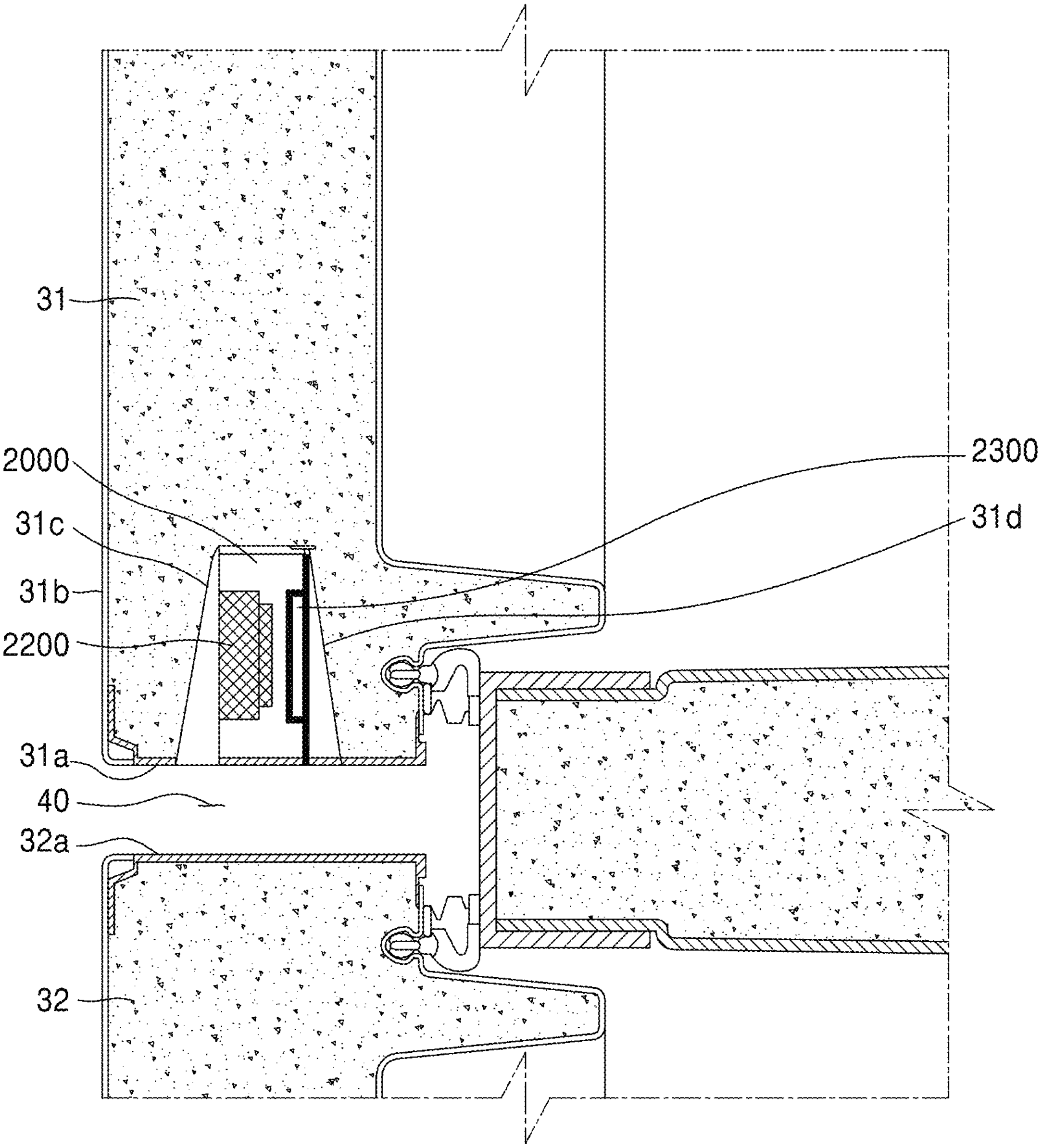
FIG. 13 is another enlarged cross-sectional view of the second speaker and the passive radiator taken along the line I-I' of FIG. 4, according to an embodiment of the disclosure.

FIG. 13 is another enlarged cross-sectional view of the second speaker and the passive radiator taken along the line I-I' of FIG. 4, according to an embodiment of the disclosure.

Referring to FIG. 13, the width of the space between the inner wall 31*c* that the second speaker 2200 faces and the second speaker 2200 differs depending on the depth of the upper door 31, and the width of the space between the inner wall 31*d* that the passive radiator 2300 faces and the passive radiator 2300 differs depending on the depth of the upper door 31. Referring to FIG. 13, as both of the inner walls 31*c* and 31*d* become wider toward the handle area 40, the sound output toward the handle area 40 may be more effectively implemented. In particular, low-band sound with a lot of diffraction may be effectively reinforced.

Although not illustrated in FIGS. 1 to 13, the refrigerator 1000 may include a first communication device that provides the speaker device 2000 with a sound signal in a wireless communication method, and the speaker device 2000 may include a second communication device that receives the sound signal from the first communication device in a wireless communication method. Furthermore, the speaker device 2000 may include a microphone (not shown) that receives a voice signal input in one side, according to an embodiment of the disclosure. The microphone may be arranged not in the speaker device 2000, but separately in the door 30 of a refrigerator or the main body 10. Due to the structure of the speaker device 2000 embedded in the door 30 of the refrigerator 1000, when the user views the refrigerator 1000 from the front side or lateral side, the speaker device 2000 is not visible from the outside of the refrigerator 1000, which is advantageous in terms of design.

Figure 14A:
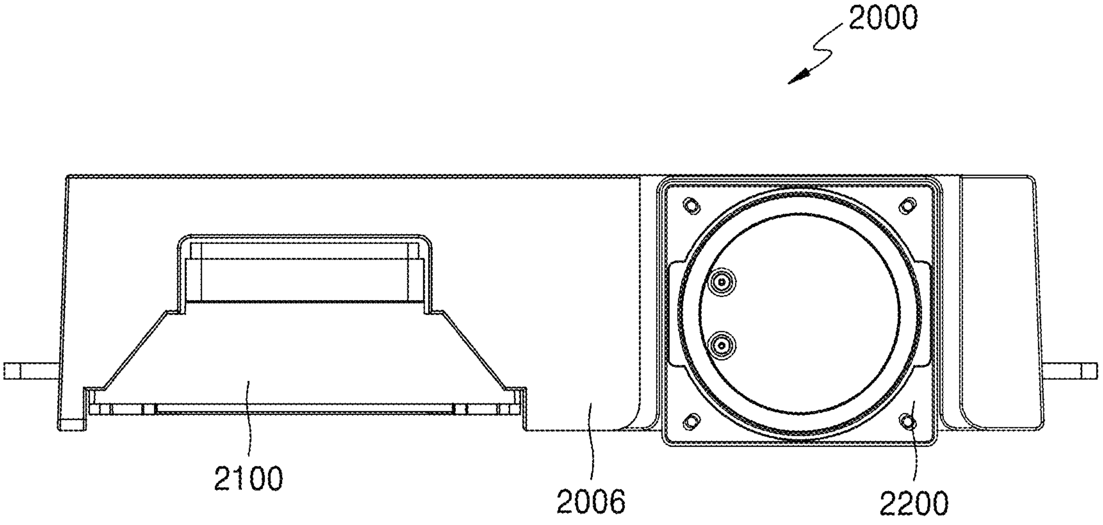
FIG. 14A is a first side view of a speaker device according to an embodiment of the disclosure.

FIG. 14A is a first side view of a speaker device according to an embodiment of the disclosure.

Referring to FIG. 14A, the first speaker 2100 faces downward and the second speaker 2200 faces the front side. The first speaker 2100 may directly emit sound toward a space in which the door 30 of a refrigerator and the handle area 40 are linked with each other. In this case, as a reflection surface is minimized, a high band in the sound output of the first speaker 2100 may be reinforced. The second speaker 2200 is embedded in the door 30 of a refrigerator and outputs sound through the first space 141. As there is a lot of a reflection surface, a low-band sound may be mainly reinforced by diffraction.

While a side portion 2006 of the speaker device 2000 is coplanar with a side surface of the first speaker 2100, the second speaker 2200 is installed lower than a height of the side portion 2006. In other words, the second speaker 2200 is installed deeper than the surface of the side portion 2006 in a rear direction of the refrigerator 1000 so that when the speaker device 2000 is embedded in the door 30 of a refrigerator, a certain space may be formed between a surface coplanar with the side portion 2006 and the surface of the second speaker 2200.

Figure 14B:
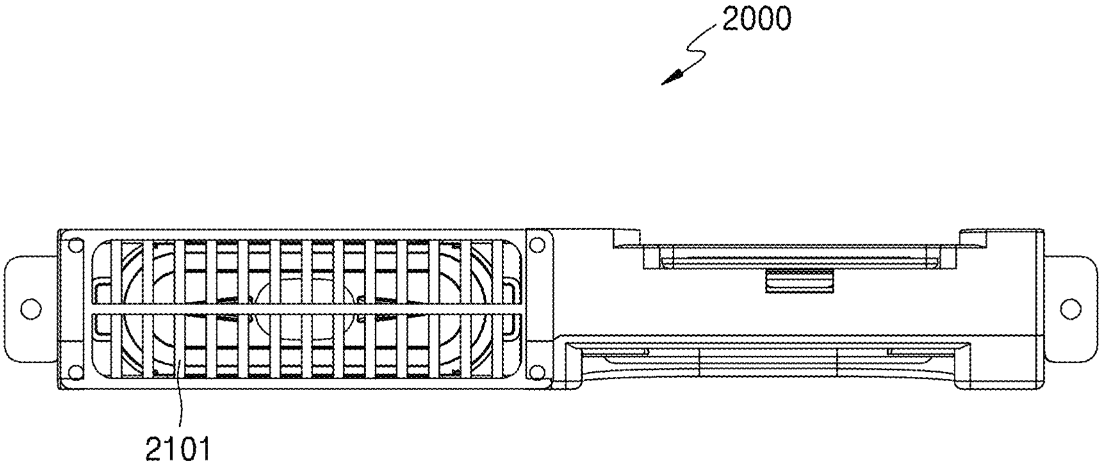
FIG. 14B is a view illustrating a speaker device, when seen from the bottom according to an embodiment of the disclosure.

FIG. 14B is a view illustrating the speaker device, when seen from the bottom according to an embodiment of the disclosure.

Referring to FIG. 14B, illustrated is a lower surface of the speaker device 2000 viewed from the handle area 40 that the first speaker 2100 faces. According to an embodiment of the disclosure, the first speaker 2100 is equipped with the grill 2101 so that the speaker device 2000 may be protected from damage that may occur due to contact with the user's hands.

Figure 14C:
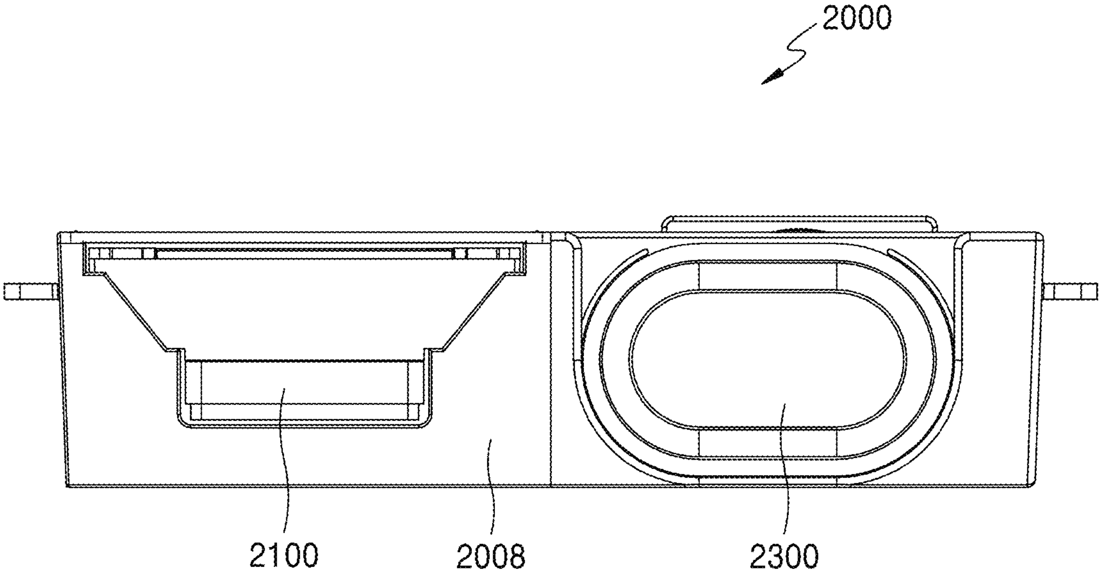
FIG. 14C is a second side view of a speaker device according to an embodiment of the disclosure.

FIG. 14C is a second side view of the speaker device according to an embodiment of the disclosure.

The side view according to FIG. 14C is a side view of the speaker device 2000 viewed from a direction opposite to FIG. 14A. Unlike FIG. 14A, in FIG. 14C, illustrated are the front side of the passive radiator 2300 installed at the opposite side of the second speaker 2200, and the lateral side of the first speaker 2100. Furthermore, the passive radiator 2300 is installed lower than a height of a side portion 2008 of the speaker device 2000 so that, even when the speaker device 2000 is embedded in the door 30 of a refrigerator, a certain space may be formed between the surface coplanar with the side portion 2008 and the surface of the passive radiator 2300.

Figure 14D:
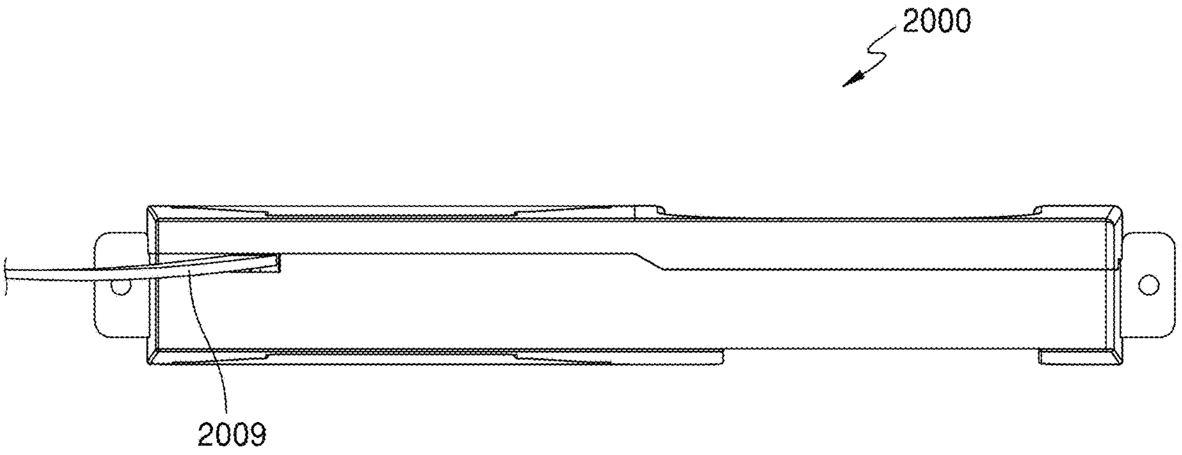
FIG. 14D is a view illustrating a speaker device, when seen from the top according to an embodiment of the disclosure.

FIG. 14D is a view illustrating the speaker device, when seen from the top according to an embodiment of the disclosure.

Referring to FIG. 14D, according to an embodiment of the disclosure, the speaker device 2000 may be provided a wire 2009 electrically connected to the refrigerator 1000. The wire 2009 may include a power line for supplying power of the speaker device 2000 and a sound signal line for transmitting a sound signal, but the disclosure is not limited thereto, and the sound signal may be transmitted wirelessly through a communication.

Figure 15:
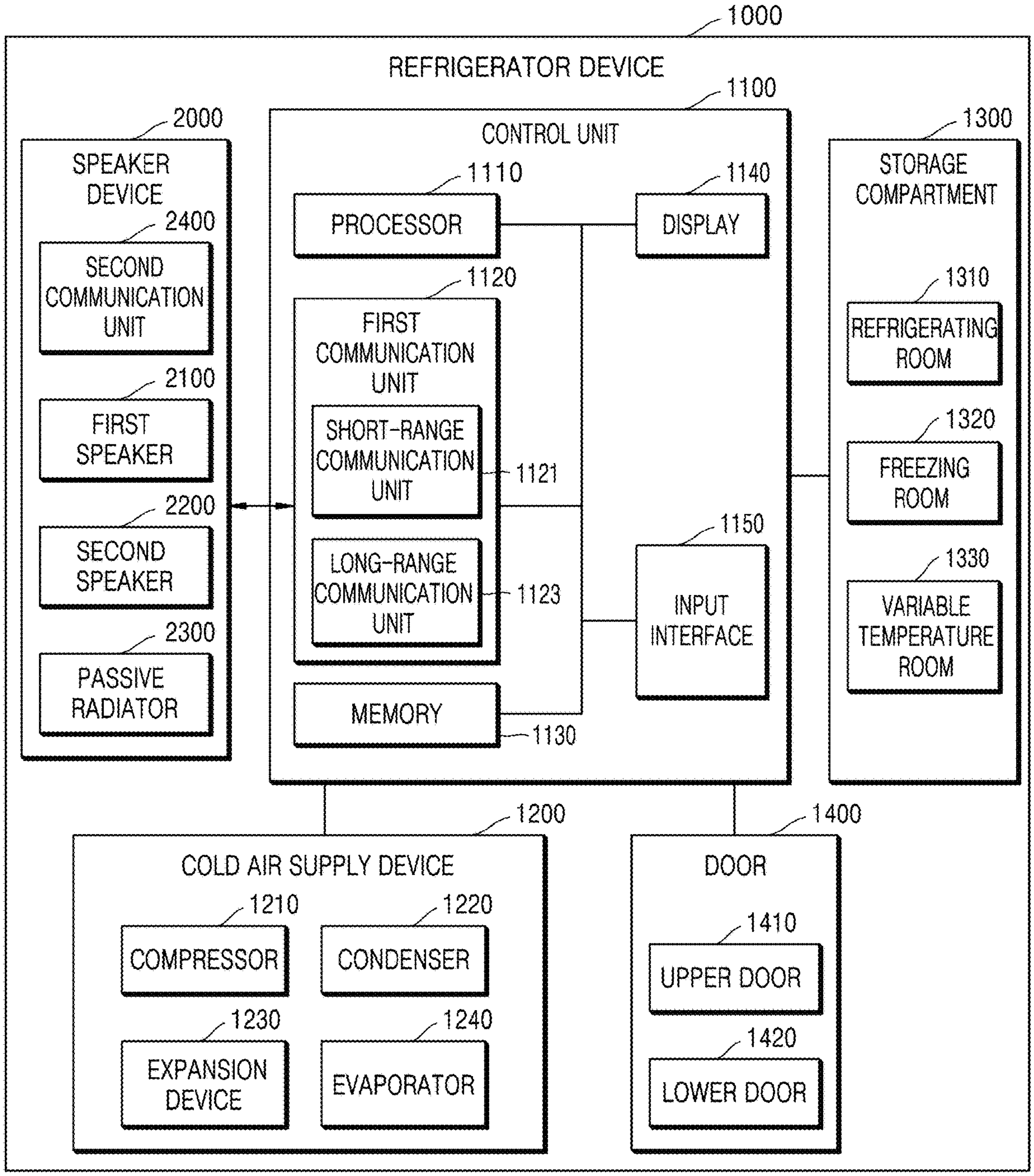
FIG. 15 is a block diagram of a refrigerator according to an embodiment of the disclosure.

FIG. 15 is a block diagram of a refrigerator according to an embodiment of the disclosure.

Referring to FIG. 15, the refrigerator 1000 according to an embodiment of the disclosure may include a control unit 1100, a cold air supply device 1200, a storage compartment 1300, a door 1400, and the speaker device 2000.

The cold air supply device 1200 may include a compressor 1210, a condenser 1220, an expansion device 1230, and an evaporator 1240 which may drive a refrigeration cycle. According to an embodiment of the disclosure, the cold air supply device 1200 may further include a semiconductor such as a thermoelectric element. The thermoelectric element may cool the storage compartment 1300 in heating and cooling operations through the Peltier effect. The storage compartment 1300 may include a refrigerating room 1310, a freezing room 1320, and a variable temperature room 1330, and the variable temperature room 1330 may be included or not depending on the design specifications of the refrigerator 1000. The refrigerating room 1310, the freezing room 1320, the variable temperature room 1330, and the like of the storage compartment 1300 may be referred to as various names, such as "a vegetable room," "a fresh room," "a cooling room," "an ice making room," and the like, and terms such as "a refrigerating room," "a freezing room," "a variable temperature room," and the like may be interpreted as encompassing storage compartments, each having a corresponding purpose and temperature range.

The door 1400 is used to preserve the cold air of the storage compartment 1300 of the refrigerator and to allow the user to put in and take out food stored in the storage compartment 1300 with respect to the refrigerator 1000, and in the case of a double door type, the door 140 may include two doors that open on both sides, may be divided into an upper door 1410 and a lower door 1420, or the upper door 1410 and the lower door 1420 may be integrated with each other. According to an embodiment of the disclosure, the speaker device 2000 may be embedded in the upper door 1410 or the lower door 1420.

The control unit 1100 may include a processor 1110, a first communication unit 1120, memory 1130, a display 1140, and an input interface 1150.

The processor 1110 included in the control unit 1100 may be implemented by one or more processors. Furthermore, the processor 1110 may include an artificial intelligence (AI) processor. The AI processor may be manufactured in the form of a dedicated hardware chip for AI, or as a part of an existing general purpose processor (e.g., a CPU or an application processor) or a graphics dedicated processor (e.g., a GPU) and mounted in the refrigerator 1000.

The processor 1110 may control, by executing programs stored in the memory 1130, the first communication unit 1120, the display 1140, and the memory 1130. According to an embodiment of the disclosure, the processor 1110 may be the AI processor. The AI processor may be manufactured in the form of a dedicated hardware chip for AI, or as a part of an existing general purpose processor (e.g., a CPU or an application processor) or a graphics dedicated processor (e.g., GPU) and mounted in the refrigerator 1000. The processor may receive temperature information of the storage compartment 1300 from a temperature sensor and generate a cooling control signal to control an operation of the cold air supply device 1200 based on the temperature information of the storage compartment 1300. The processor 1110 may receive a user's input from the input interface 1150, and transmit a display control signal and video data to the display 1140 to display an image on the display 1140 in response to the user's input.

The processor 1110 may control the display 1140 to display information, such as a state, an error, and the like of the refrigerator 1000, or a notification content to the user. The first communication unit 1120 may include one or more components that enable a communication between the refrigerator 1000 and a server device (not shown), or between the refrigerator 1000 and a mobile device (not shown). For example, the first communication unit 1120 may include a short-range communication unit 1121, a long-range communication unit 1123, and the like.

The short-range communication unit 1121 may include a Bluetooth communication unit, a Bluetooth low energy (BLE) communication unit, a near field communication unit (NFC), a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, and the like, but the disclosure is not limited thereto. The long-range communication unit 1123 may be used for communication with a server device (not shown) when the refrigerator 1000 is remotely controlled by the server device in an IoT environment. The long-range communication unit 1123 may include the Internet, a computer network (e.g., local area network (LAN) or wide area network (WAN)), and a mobile communication unit. The mobile communication unit may include a third generation (3G) module, a fourth generation (4G) module, a fifth generation (5G) module, a long term evolution (LTE) module, a narrowband IoT (NB-IoT) module, an LTE-M module, and the like, but the disclosure is not limited thereto.

The display 1140 is used to display necessary data.

When the display 1140 is configured as a touch screen by forming a layer structure with a touchpad, the display 1140 may be used as an input interface. The display 1140 may include at least one of a liquid crystal display, a thin film transistor-liquid crystal display, a light-emitting diode (LED), an organic light-emitting diode, a flexible display, a three-dimensional (3D) display, and an electrophoretic display. The refrigerator 1000 may include two or more displays 1140 depending on the implement type of the refrigerator 1000.

The input interface 1150 receives an input from the user. The input interface 1150 may include at least one of a key pad, a dome switch, a touch pad (a contact capacitive type, a pressure-resistive type, an infrared detection type, a surface ultrasonic conduction type, an integral tension measurement type, a piezo effect type, etc.), a jog wheel, and a jog switch, but the disclosure is not limited thereto.

The input interface 1150 may include a voice recognition module. For example, the refrigerator 1000 may receive a voice signal that is an analog signal through a microphone, and may convert a voice part into a computer-readable text by using an automatic speech recognition (ASR) model. Furthermore, the refrigerator 1000 may receive a voice signal through a microphone and output the same to the speaker device 2000. The refrigerator 1000 may obtain user's utterance intention by interpreting text converted by using a natural language understanding (NLU) model. Here, the ASR model or NLU model may be an artificial intelligence model. The artificial intelligence model may be processed by an artificial intelligence dedicated processor designed as a hardware structure that is specialized for processing an artificial intelligence model. The artificial intelligence model may be created through training. Here, being created through training means that a predefined operation rule or artificial intelligence model set to perform desired characteristics (or purpose) is created by training a basic artificial intelligence model using a large number of training data by a training algorithm. The artificial intelligence model may include a plurality of neural network layers. Each of a plurality of neural network layers has a plurality of weight values and performs a neural network operation through an operation between an operation result of a previous layer and a plurality of weight values.

Linguistic understating is technology to recognize and apply/process human languages/characters, and may include natural language processing, machine translation, a dialog system, question answering, speech recognition/synthesis, and the like.

The memory 1130 may store a program to process and control the processor 1110, and store data to be input/output. The memory 1130 may store an artificial intelligence model. For example, the memory 1130 may store an artificial intelligence model for sound recognition, an artificial intelligence model for sound output, and the like. The memory 1130 may store programs and/or data to control components included in the refrigerator 1000, and store temporary data generated during generation of a control signal to control the components included in the refrigerator 1000.

The memory 1130 may include at least one type of storage media including a flash memory type, a hard disk type, a multimedia card micro type, a card type memory (e.g. an SD or XD memory, etc.), a random access memory (RAM), a static random access memory (SRAM), read-only memory (ROM), an electrically erasable programmable read-only memory (EEPROM), a programmable read-only memory (PROM), a magnetic memory, a magnetic disk, an optical disc, etc. Furthermore, the refrigerator 1000 may operate a web storage or a cloud server that performs a storage function on the Internet.

In an embodiment of the disclosure, the speaker device 2000 may include the first speaker 2100 and the second speaker 2200. According to an embodiment of the disclosure, the speaker device 2000 may further include the passive radiator 2300. The speaker device 2000 may further include a second communication unit 2400 to communicate with the first communication unit 1120 of the control unit 1100. The speaker device 2000 may be connected to the control unit 1100 by wire or wirelessly. When the speaker device 2000 is wirelessly connected to the control unit 1100, the speaker device 2000 may receive data including sound information through the second communication unit 2400.

The speaker device 2000 may receive sound information from the control unit 1100 and output sound through the first speaker 2100, the second speaker 2200, and the passive radiator 2300. The sound information may include various pieces of information including the sound information that the control unit 1100 received through the microphone or a warning or an error notification that needs to be notified to the user. For example, when ice making is completed in the freezing room 1320, a voice message that "Ice making is completed" may be output through the speaker device 2000, and such a message may be sent as a text or voice to a user's mobile device through the first communication unit 1120. The speaker device 2000 may play desired music by being wirelessly connected to the user's mobile device.

A method according to an embodiment of the disclosure may be embodied as program instructions executable by various computer devices, and recorded on a computer-readable medium. The computer-readable medium may include a program command, a data file, a data structure, or the like separately or in combinations. The program instructions to be recorded on the medium may be specially designed and configured for the disclosure or may be well-known to and be usable by those skill in the art of computer software. Examples of the computer-readable recording medium include magnetic media such as hard disks, floppy disks, or magnetic tapes, optical media such as compact disc ROMs (CD-ROMs) or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter or the like.

The embodiment of the disclosure may be embodied in the form of a recording medium including computer executable instructions, such as a program module executed by a computer. A computer-readable storage medium may be a useable medium that is accessible by a computer and may include all of volatile and non-volatile media and separable and inseparable media. Furthermore, the computer-readable medium may include all of computer storage media and communication media. The computer storage media may include all of volatile and non-volatile media and separable and inseparable media, which are embodied by a certain method or technology for storing information such as computer-readable instructions, data structures, program modules, or other data. The communication media may typically include computer-readable instructions, data structures, program modules, or other data of a modulated data signal such as a carrier wave, or other transmission mechanism, and may also include information transmission media. Furthermore, the embodiment of the disclosure may be embodied in the form of a computer program or computer program product including computer executable instructions, such as a computer program executed by a computer.

A machine-readable storage medium may be provided in the form of a non-transitory storage medium. Here, the term 'non-transitory' merely means that the storage medium does not refer to a transitory electrical signal but is tangible, and does not distinguish whether data is stored semi-permanently or temporarily on the storage medium. For example, the non-transitory storage medium may include a buffer in which data is temporarily stored.

According to an embodiment of the disclosure, the methods according to various embodiments disclosed herein may be included in a computer program product and then provided. The computer program products may be traded as commodities between sellers and buyers. The computer program product may be distributed in the form of a machine-readable storage medium (e.g., a CD-ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or memory of a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator comprising:

a main body;

a storage compartment;

a door configured to open and close the storage compartment; and a speaker device embedded in the door, wherein the door comprises:

an upper door, and a lower door, and wherein the speaker device comprises:

at least one first speaker facing a first direction that is a user handle space direction, and configured to output sound in a full-range frequency band, and at least one second speaker facing a second direction that is a door inner wall surface direction as a direction different from the first direction, and configured to output sound in a full-range frequency band.

2. The refrigerator of claim 1, further comprising:

a passive radiator arranged at an opposite side to the at least one second speaker and facing a third direction opposite to the second direction.

3. The refrigerator of claim 2, wherein the speaker device is installed inside the upper door, wherein the first direction is a direction from the upper door to the lower door, wherein the second direction is a direction toward a front side of the refrigerator in the upper door, and wherein the third direction is a direction toward a rear side of the refrigerator.

4. The refrigerator of claim 1, wherein the speaker device is embedded in a vertical direction of the upper door, and wherein the speaker device has a first certain space in the second direction between the at least one second speaker and an inside wall surface of the upper door of the refrigerator.

5. The refrigerator of claim 4, wherein a width of the first certain space differs in the vertical direction of the upper door.

6. The refrigerator of claim 4, wherein a width of the first certain space increases downward in the vertical direction of the upper door.

7. The refrigerator of claim 3, wherein a second certain space is provided in the third direction between the passive radiator and an inner wall surface of the upper door, and wherein a width of the second certain space increases downward in a vertical direction of the upper door.

8. The refrigerator of claim 1, wherein the at least one first speaker is exposed in a direction from the upper door of the refrigerator toward the lower door.

9. The refrigerator of claim 1, further comprising:

a grill covering a front side of the at least one first speaker.

10. A refrigerator comprising:

a main body;

a storage compartment;

a door configured to open and close the storage compartment; and a speaker device embedded in the door, wherein the door comprises:

an upper door, and a lower door, and wherein the speaker device comprises:

at least one first speaker configured to output high-band sound, facing a first direction that is a direction toward a handle of the door, at least one second speaker configured to output low-band sound, facing a second direction that is a direction toward an inner wall surface of the door, and a passive radiator in a rear side of the second speaker, facing a third direction that is opposite to the second direction.

11. The refrigerator of claim 10, wherein the speaker device is installed inside the upper door, wherein the first direction is a direction from the upper door to the lower door, wherein the second direction is a direction toward a front side of the refrigerator in the upper door, and wherein the third direction is a direction toward a rear side of the refrigerator.

12. The refrigerator of claim 10, wherein the speaker device is embedded in a vertical direction of the upper door, and wherein the speaker device has a first certain space in the second direction between the at least one second speaker and an inside wall surface of the upper door.

13. The refrigerator of claim 12, wherein a width of the first certain space between the at least one second speaker and an inner wall surface of the upper door increases downward in the vertical direction of the upper door.

14. The refrigerator of claim 13, wherein a second certain space is provided in the third direction between the passive radiator and an inner wall surface of the upper door, and wherein a width of the second certain space increases downward in the vertical direction of the upper door.

15. The refrigerator of claim 10, wherein the at least one first speaker is exposed in a direction from the upper door toward the lower door.

* * * * *